United States Patent
Fathieh et al.

(10) Patent No.: US 12,482,565 B2
(45) Date of Patent: Nov. 25, 2025

(54) METHODS AND SYSTEMS FOR ENGINEERING CONDUCTION DEVIATION FEATURES FROM BIOPHYSICAL SIGNALS FOR USE IN CHARACTERIZING PHYSIOLOGICAL SYSTEMS

(71) Applicant: Analytics for Life Inc., Toronto (CA)

(72) Inventors: Farhad Fathieh, North York (CA); Timothy William Fawcett Burton, Ottawa (CA)

(73) Assignee: Analytics for Life Inc., Toronto (CA)

( * ) Notice: Subject to any disclaimer, the term of this patent is extended or adjusted under 35 U.S.C. 154(b) by 353 days.

(21) Appl. No.: 17/891,380

(22) Filed: Aug. 19, 2022

(65) Prior Publication Data

US 2023/0075634 A1     Mar. 9, 2023

Related U.S. Application Data

(60) Provisional application No. 63/235,974, filed on Aug. 23, 2021.

(51) Int. Cl.
    *G16H 50/20*     (2018.01)
    *A61B 5/349*     (2021.01)
    *G16H 50/30*     (2018.01)

(52) U.S. Cl.
    CPC ............. *G16H 50/20* (2018.01); *A61B 5/349* (2021.01); *G16H 50/30* (2018.01)

(58) Field of Classification Search
    CPC ........ A61B 5/346; A61B 5/349; G16H 50/20; G16H 50/30
    See application file for complete search history.

(56) References Cited

U.S. PATENT DOCUMENTS

| | | |
|---|---|---|
| 8,923,958 B2 | 12/2014 | Gupta et al. |
| 9,289,150 B1 | 3/2016 | Shyamlal et al. |

(Continued)

FOREIGN PATENT DOCUMENTS

| | | |
|---|---|---|
| WO | 2010084211 A1 | 7/2010 |
| WO | 2017033164 A1 | 3/2017 |

(Continued)

OTHER PUBLICATIONS

International Search Report and Written Opinion, mailed Nov. 15, 2022, received in connection with corresponding International Patent Application No. PCT/IB2022/057805.

(Continued)

*Primary Examiner* — John R Downey
(74) *Attorney, Agent, or Firm* — Meunier Carlin & Curfman LLC

(57) ABSTRACT

A clinical evaluation system and method are disclosed that facilitate the use of one or more conduction deviation features or parameters determined from biophysical signals such as cardiac or biopotentials signals. Conduction derivation features or parameters may include VD conduction derivation features or parameters and/or VD conduction derivation Poincaré features or parameters. The conduction derivation features or parameters can be used in a model or classifier (e.g., a machine-learned classifier) to estimate metrics associated with the physiological state of a patient, including for the presence or non-presence of a disease, a medical condition, or an indication of either. The estimated metric may be used to assist a physician or other healthcare provider in diagnosing the presence or non-presence and/or severity and/or localization of diseases or conditions or in the treatment of said diseases or conditions.

19 Claims, 16 Drawing Sheets

(56) References Cited

U.S. PATENT DOCUMENTS

| | | |
|---|---|---|
| 9,408,543 B1 | 8/2016 | Exner et al. |
| 9,597,021 B1 | 3/2017 | Howe-Patterson et al. |
| 9,655,536 B2 | 5/2017 | Mohsen et al. |
| 9,737,229 B1 | 8/2017 | Burton et al. |
| 9,910,964 B2 | 3/2018 | Burton et al. |
| 9,955,883 B2 | 5/2018 | Burton et al. |
| 9,968,265 B2 | 5/2018 | Gupta et al. |
| 9,968,275 B2 | 5/2018 | Burton et al. |
| 10,039,468 B2 | 8/2018 | Exner et al. |
| 10,292,596 B2 | 5/2019 | Crawford et al. |
| 10,362,950 B2 | 7/2019 | Burton et al. |
| 10,542,897 B2 | 1/2020 | Crawford et al. |
| 10,566,091 B2 | 2/2020 | Shyamlal et al. |
| 10,566,092 B2 | 2/2020 | Burton et al. |
| 10,672,518 B2 | 6/2020 | Burton et al. |
| 10,806,349 B2 | 10/2020 | Crawford et al. |
| 2016/0022164 A1 | 1/2016 | Brockway et al. |
| 2018/0000374 A1 | 1/2018 | Gupta et al. |
| 2018/0249960 A1 | 9/2018 | Gupta et al. |
| 2019/0026430 A1 | 1/2019 | Grouchy et al. |
| 2019/0026431 A1 | 1/2019 | Grouchy et al. |
| 2019/0200893 A1* | 7/2019 | Grouchy ............ A61B 5/0044 |
| 2019/0214137 A1 | 7/2019 | Gupta et al. |
| 2019/0365265 A1 | 12/2019 | Grouchy et al. |
| 2019/0384757 A1 | 12/2019 | Garrett et al. |
| 2020/0029842 A1 | 1/2020 | Felix et al. |
| 2020/0085311 A1 | 3/2020 | Tzvieli et al. |
| 2020/0138291 A1 | 5/2020 | Bardy et al. |
| 2020/0205739 A1 | 7/2020 | Garrett et al. |
| 2020/0205745 A1 | 7/2020 | Khosousi et al. |
| 2020/0211713 A1* | 7/2020 | Shadforth ............ G16H 50/50 |
| 2020/0229724 A1 | 7/2020 | Gupta et al. |
| 2020/0335217 A1 | 10/2020 | Burton et al. |
| 2020/0397324 A1 | 12/2020 | Paak et al. |
| 2021/0212582 A1 | 7/2021 | Fathieh et al. |
| 2022/0192596 A1 | 6/2022 | Fathieh et al. |
| 2023/0055617 A1 | 2/2023 | Lange et al. |
| 2023/0071085 A1 | 3/2023 | Doomra |
| 2023/0071467 A1 | 3/2023 | Burton et al. |
| 2023/0072281 A1 | 3/2023 | Fathieh et al. |
| 2023/0075570 A1 | 3/2023 | Fathieh |
| 2023/0076069 A1 | 3/2023 | Lange et al. |
| 2023/0127355 A1 | 4/2023 | Paak et al. |

FOREIGN PATENT DOCUMENTS

| | | |
|---|---|---|
| WO | 2017221221 A1 | 12/2017 |
| WO | 2018158749 A1 | 9/2018 |
| WO | 2019077414 A1 | 4/2019 |
| WO | 2019130272 A1 | 7/2019 |
| WO | 2019130273 A1 | 7/2019 |
| WO | 2019234587 A1 | 12/2019 |
| WO | 2019244043 A1 | 12/2019 |
| WO | 2020136569 A1 | 7/2020 |
| WO | 2020136570 A1 | 7/2020 |
| WO | 2020136571 A1 | 7/2020 |
| WO | 2020254881 A1 | 12/2020 |
| WO | 2020254882 A1 | 12/2020 |

OTHER PUBLICATIONS

International Preliminary Report on Patentability, issued Feb. 27, 2024, received in connection with corresponding International Patent Application No. PCT/IB2022/057805.

Farhad, F. et al., Predicting cardiac disease from interactions of simultaneously-acquired hemodynamic and cardiac signals, Computer Methods and Programs in Biomedicine, vol. 202, Apr. 2021.

Cho et al., "A preliminary study on photoplethysmogram (PPG) signal analysis for reduction of motion artifact in frequency domain," 2012 IEEE-EMBS Conference on Biomedical Engineering and Sciences, Langkawi, pp. 28-33 (2012). doi: 10.1109/IECBES.2012.6498141.

* cited by examiner

METHODS AND SYSTEMS FOR ENGINEERING CONDUCTION DEVIATION FEATURES FROM BIOPHYSICAL SIGNALS FOR USE IN CHARACTERIZING PHYSIOLOGICAL SYSTEMS

RELATED APPLICATION

This US application claims priority to, and the benefit of, U.S. Provisional Patent Application No. 63/235,974, filed Aug. 23, 2021, entitled "Methods and Systems for Engineering Conduction Deviation Features From Biophysical Signals for Use in Characterizing Physiological Systems," which is incorporated by reference herein in its entirety.

FIELD OF THE INVENTIONS

The present disclosure generally relates to methods and systems for engineering features or parameters from biophysical signals for use in diagnostic applications; in particular, the engineering and use of conduction deviation features for use in characterizing one or more physiological systems and their associated functions, activities, and abnormalities. The features or parameters may also be used for monitoring or tracking, controls of medical equipment, or to guide the treatment of a disease, medical condition, or an indication of either.

BACKGROUND

There are numerous methods and systems for assisting a healthcare professional in diagnosing disease. Some of these involve the use of invasive or minimally invasive techniques, radiation, exercise or stress, or pharmacological agents, sometimes in combination, with their attendant risks and other disadvantages.

Diastolic heart failure, a major cause of morbidity and mortality, is defined as symptoms of heart failure in a patient with preserved left ventricular function. It is characterized by a stiff left ventricle with decreased compliance and impaired relaxation leading to increased end-diastolic pressure in the left ventricle, which is measured through left heart catheterization. Current clinical standard of care for diagnosing pulmonary hypertension (PH), and for pulmonary arterial hypertension (PAH), in particular, involves a cardiac catheterization of the right side of the heart that directly measures the pressure in the pulmonary arteries. Coronary angiography is the current standard of care used to assess coronary arterial disease (CAD) as determined through the coronary lesions described by a treating physician. Non-invasive imaging systems such as magnetic resonance imaging and computed tomography require specialized facilities to acquire images of blood flow and arterial blockages of a patient that are reviewed by radiologists.

It is desirable to have a system that can assist healthcare professionals in the diagnosis of cardiac disease and various other diseases and conditions without the aforementioned disadvantages.

SUMMARY

A clinical evaluation system and method are disclosed that facilitate the use of one or more conduction deviation features or parameters determined from biophysical signals such as cardiac or biopotentials signals. Conduction derivation features or parameters may include ventricular depolarization (VD) conduction derivation features or parameters and/or VD conduction derivation Poincaré features or parameters. The conduction derivation features or parameters can be used in a model or classifier (e.g., a machine-learned classifier) to estimate metrics associated with the physiological state of a patient, including for the presence or non-presence of a disease, medical condition, or an indication of either. The estimated metric may be used to assist a physician or other healthcare provider in diagnosing the presence or non-presence and/or severity and/or localization of diseases or conditions or in the treatment of said diseases or conditions.

The VD conduction deviation properties are a set of metrics that can quantify the deviation of an input signal (e.g., a biophysical signal such as cardiac signals) from a model of the acquired signal in a lower-dimensional subspace. In some embodiments, the model is generated by a Multi-Dimensional Fourier Decomposer (MDFD) to which a residue can be generated from the difference between the input signal and the model, though other signal estimation techniques may be used.

The estimation or determined likelihood of the presence or non-presence of a disease, condition, or indication of either can supplant, augment, or replace other evaluation or measurement modalities for the assessment of a disease or medical condition. In some cases, a determination can take the form of a numerical score and related information.

As used herein, the term "feature" (in the context of machine learning and pattern recognition and as used herein) generally refers to an individual measurable property or characteristic of a phenomenon being observed. A feature is defined by analysis and may be determined in groups in combination with other features from a common model or analytical framework.

As used herein, "metric" refers to an estimation or likelihood of the presence, non-presence, severity, and/or localization (where applicable) of one or more diseases, conditions, or indication(s) of either, in a physiological system or systems. Notably, the exemplified methods and systems can be used in certain embodiments described herein to acquire biophysical signals and/or to otherwise collect data from a patient and to evaluate those signals and/or data in signal processing and classifier operations to evaluate for a disease, condition, or indicator of one that can supplant, augment, or replace other evaluation modalities via one or more metrics. In some cases, a metric can take the form of a numerical score and related information.

In the context of cardiovascular and respiratory systems, examples of diseases and conditions to which such metrics can relate include, for example: (i) heart failure (e.g., left-side or right-side heart failure; heart failure with preserved ejection fraction (HFpEF)), (ii) coronary artery disease (CAD), (iii) various forms of pulmonary hypertension (PH) including without limitation pulmonary arterial hypertension (PAH), (iv) abnormal left ventricular ejection fraction (LVEF), and various other diseases or conditions. An example indicator of certain forms of heart failure is the presence or non-presence of elevated or abnormal left-ventricular end-diastolic pressure (LVEDP). An example indicator of certain forms of pulmonary hypertension is the presence or non-presence of elevated or abnormal mean pulmonary arterial pressure (mPAP).

BRIEF DESCRIPTION OF THE DRAWINGS

The accompanying drawings, which are incorporated in and constitute a part of this specification, illustrate embodiments and, together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED DESCRIPTION

Figure 1:
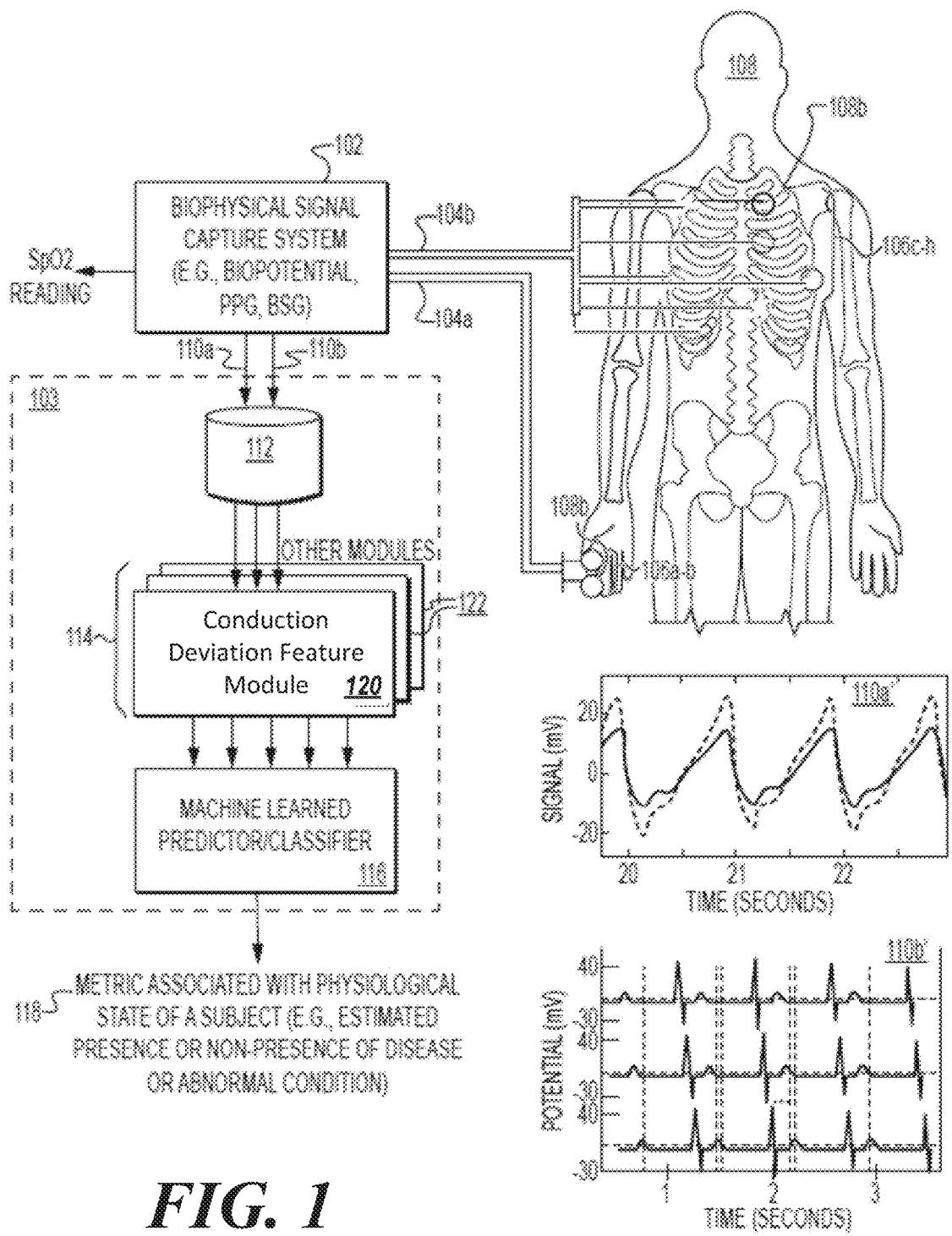
FIG. 1 is a schematic diagram of example modules, or components, configured to non-invasively compute conduction deviation features or parameters to generate one or more metrics associated with the physiological state of a patient in accordance with an illustrative embodiment.

Each and every feature described herein, and each and every combination of two or more of such features, is included within the scope of the present invention provided that the features included in such a combination are not mutually inconsistent.

While the present disclosure is directed to the practical assessment of biophysical signals, e.g., raw or pre-processed photoplethysmographic signals, biopotential/cardiac signals, etc., in the diagnosis, tracking, and treatment of cardiac-related pathologies and conditions, such assessment can be applied to the diagnosis, tracking, and treatment (including without limitation surgical, minimally invasive, lifestyle, nutritional, and/or pharmacologic treatment, etc.) of any pathologies or conditions in which a biophysical signal is involved in any relevant system of a living body. The assessment may be used in the controls of medical equipment or wearable devices or in monitoring applications (e.g., to report the conduction deviation features, parameters, or an intermediate output discussed herein)

The terms "subject" and "patient" as used herein are generally used interchangeably to refer to those who had undergone analysis performed by the exemplary systems and methods.

The term "cardiac signal" as used herein refers to one or more signals directly or indirectly associated with the structure, function, and/or activity of the cardiovascular system—including aspects of that signal's electrical/electrochemical conduction—that, e.g., cause contraction of the myocardium. A cardiac signal may include, in some embodiments, biopotential signals or electrocardiographic signals, e.g., those acquired via an electrocardiogram (ECG), the cardiac and photoplethysmographic waveform or signal capture or recording instrument later described herein, or other modalities.

The term "biophysical signal" as used herein includes but is not limited to one or more cardiac signal(s), neurological signal(s), ballistocardiographic signal(s), and/or photoplethysmographic signal(s), but it also encompasses more broadly any physiological signal from which information may be obtained. Not intending to be limited by example, one may classify biophysical signals into types or categories that can include, for example, electrical (e.g., certain cardiac and neurological system-related signals that can be observed, identified, and/or quantified by techniques such as the measurement of voltage/potential (e.g., biopotential), impedance, resistivity, conductivity, current, etc. in various domains such as time and/or frequency), magnetic, electromagnetic, optical (e.g., signals that can be observed, identified and/or quantified by techniques such as reflectance, interferometry, spectroscopy, absorbance, transmissivity, visual observation, photoplethysmography, and the like), acoustic, chemical, mechanical (e.g., signals related to fluid flow, pressure, motion, vibration, displacement, strain), thermal, and electrochemical (e.g., signals that can be correlated to the presence of certain analytes, such as glucose). Biophysical signals may in some cases be described in the context of a physiological system (e.g., respiratory, circulatory (cardiovascular, pulmonary), nervous, lymphatic, endocrine, digestive, excretory, muscular, skeletal, renal/urinary/excretory, immune, integumentary/exocrine and reproductive systems), one or more organ system(s) (e.g., signals that may be unique to the heart and lungs as they work together), or in the context of tissue (e.g., muscle, fat, nerves, connective tissue, bone), cells, organelles, molecules (e.g., water, proteins, fats, carbohydrates, gases, free radicals, inorganic ions, minerals, acids, and other compounds, elements, and their subatomic components. Unless stated otherwise, the term "biophysical signal acquisition" generally refers to any passive or active means of acquiring a biophysical signal from a physiological system, such as a mammalian or non-mammalian organism. Passive and active biophysical signal acquisition generally refers to the observation of natural or induced electrical, magnetic, optical, and/or acoustics emittance of the body tissue. Non-limiting examples of passive and active biophysical signal acquisition means include, e.g., voltage/potential, current, magnetic, optical, acoustic, and other non-active ways of observing the natural emittance of the body tissue, and in some instances, inducing such emittance. Non-limiting examples of passive and active biophysical signal acquisition means include, e.g., ultrasound, radio waves, microwaves, infrared and/or visible light (e.g., for use in pulse oximetry or photoplethysmography), visible light, ultraviolet light, and other ways of actively interrogating the body tissue that does not involve ionizing energy or radiation (e.g., X-ray). An active biophysical signal acquisition may involve excitation-emission spectroscopy (including, for example, excitation-emission fluorescence). The active biophysical signal acquisition may also involve transmitting ionizing energy or radiation (e.g., X-ray) (also referred to as "ionizing biophysical signal") to the body tissue. Passive and active biophysical signal acquisition means can be performed in conjunction with invasive procedures (e.g., via surgery or invasive radiologic intervention protocols) or non-invasively (e.g., via imaging, ablation, heart contraction regulation (e.g., via pacemakers), catheterization, etc.).

The term "photoplethysmographic signal" as used herein refers to one or more signals or waveforms acquired from optical sensors that correspond to measured changes in light absorption by oxygenated and deoxygenated hemoglobin, such as light having wavelengths in the red and infrared spectra. Photoplethysmographic signal(s), in some embodiments, include a raw signal(s) acquired via a pulse oximeter or a photoplethysmogram (PPG). In some embodiments, photoplethysmographic signal(s) are acquired from off-the-shelf, custom, and/or dedicated equipment or circuitries that are configured to acquire such signal waveforms for the purpose of monitoring health and/or diagnosing disease or abnormal conditions. The photoplethysmographic signal(s) typically include a red photoplethysmographic signal (e.g., an electromagnetic signal in the visible light spectrum most dominantly having a wavelength of approximately 625 to 740 nanometers) and an infrared photoplethysmographic signal (e.g., an electromagnetic signal extending from the nominal red edge of the visible spectrum up to about 1 mm), though other spectra such as near-infrared, blue and green may be used in different combinations, depending on the type and/or mode of PPG being employed.

The term "ballistocardiographic signal," as used herein, refers to a signal or group of signals that generally reflect, the flow of blood through the entire body that may be observed through vibration, acoustic, movement, or orientation. In some embodiments, ballistocardiographic signals are acquired by wearable devices, such as vibration, acoustic, movement, or orientation-based seismocardiogram (SCG) sensors, which can measure the body's vibrations or orientation as recorded by sensors mounted close to the heart. Seismocardiogram sensors are generally used to acquire "seismocardiogram," which is used interchangeably with the term "ballistocardiogram" herein. In other embodiments, ballistocardiographic signals may be acquired by external equipment, e.g., bed or surface-based equipment that measures phenomena such as a change in body weight as blood moves back and forth in the longitudinal direction between the head and feet. In such embodiments, the volume of blood in each location may change dynamically and be reflected in the weight measured at each location on the bed as well as the rate of change of that weight.

In addition, the methods and systems described in the various embodiments herein are not so limited and may be utilized in any context of another physiological system or systems, organs, tissue, cells, etc., of a living body. By way of example only, two biophysical signal types that may be useful in the cardiovascular context include cardiac/biopotential signals that may be acquired via conventional electrocardiogram (ECG/EKG) equipment, bipolar wide-band biopotential (cardiac) signals that may be acquired from other equipment such as those described herein, and signals that may be acquired by various plethysmographic techniques, such as, e.g., photoplethysmography. In another example, the two biophysical signal types can be further augmented by ballistocardiographic techniques.

FIG. 1 is a schematic diagram of example modules, or components, configured to non-invasively compute conduction deviation features or parameters to generate, via a classifier (e.g., machine-learned classifier), one or more metrics associated with the physiological state of a patient in accordance with an illustrative embodiment. The modules or components may be used in a production application or the development of the conduction deviation features and other classes of features.

The example analysis and classifiers described herein may be used to assist a healthcare provider in the diagnosis and/or treatment of cardiac- and cardiopulmonary-related pathologies and medical conditions or an indicator of one. Examples include significant coronary artery disease (CAD), one or more forms of heart failure such as, e.g., heart failure with preserved ejection fraction (HFpEF), congestive heart failure, various forms of arrhythmia, valve failure, various forms of pulmonary hypertension, among various other disease and conditions disclosed herein.

In addition, there exist possible indicators of a disease or condition, such as an elevated or abnormal left ventricular end-diastolic pressure (LVEDP) value as it relates to some forms of heart failure, abnormal left ventricular ejection fraction (LVEF) values as they relate to some forms of heart failure or an elevated mean pulmonary arterial pressure (mPAP) value as it relates to pulmonary hypertension and/or pulmonary arterial hypertension. Indicators of the likelihood that such indicators are abnormal/elevated or normal, such as those provided by the example analysis and classifiers described herein, can help a healthcare provider assess or diagnose that the patient has or does not have a given disease or condition. In addition to these metrics associated with a disease state of condition, other measurements and factors may be employed by a healthcare professional in making a diagnosis, such as the results of a physical examination and/or other tests, the patient's medical history, current medications, etc. The determination of the presence or non-presence of a disease state or medical condition can include the indication (or a metric of measure that is used in the diagnosis) for such disease.

In FIG. 1, the components include at least one non-invasive biophysical signal recorder or capture system 102 and an assessment system 103 that is located, for example, in a cloud or remote infrastructure or in a local system. Biophysical signal capture system 102 (also referred to as a biophysical signal recorder system), in this embodiment, is configured to, e.g., acquire, process, store and transmit synchronously acquired patient's electrical and hemodynamic signals as one or more types of biophysical signals 104. In the example of FIG. 1, the biophysical signal capture system 102 is configured to synchronously capture two types of biophysical signals shown as first biophysical signals 104a (e.g., synchronously acquired to other first biophysical signals) and second biophysical signals 104b (e.g., synchronously acquired to the other biophysical signals) acquired from measurement probes 106 (e.g., shown as probes 106a and 106b, e.g., comprising hemodynamic sensors for hemodynamic signals 104a, and probes 106c-106h comprising leads for electrical/cardiac signals 104b). The probes 106a-h are placed on, e.g., by being adhered to or placed next to, a surface tissue of a patient 108 (shown at patient locations 108a and 108b). The patient is preferably a human patient, but it can be any mammalian patient. The acquired raw biophysical signals (e.g., 106a and 106b) together form a biophysical-signal data set 110 (shown in FIG. 1 as a first biophysical-signal data set 110a and a second biophysical-signal data set 110b, respectively) that may be stored, e.g., as a single file, preferably, that is identifiable by a recording/signal captured number and/or by a patient's name and medical record number.

In the FIG. 1 embodiment, the first biophysical-signal data set 110a comprises a set of raw photoplethysmographic, or hemodynamic, signal(s) associated with measured changes in light absorption of oxygenated and/or deoxygenated hemoglobin from the patient at location 108a, and the second biophysical-signal data set 110b comprises a set of raw cardiac or biopotential signal(s) associated with electrical signals of the heart. Though in FIG. 1, raw photoplethysmographic or hemodynamic signal(s) are shown being acquired at a patient's finger, the signals may be alternatively acquired at the patient's toe, wrist, forehead, earlobe, neck, etc. Similarly, although the cardiac or biopotential signal(s) are shown to be acquired via three sets of orthogonal leads, other lead configurations may be used (e.g., 11 lead configuration, 12 lead configuration, etc.).

Plots 110a' and 110b' show examples of the first biophysical-signal data set 110a and the second biophysical-signal data set 110a, respectively. Specifically, Plot 110a' shows an example of an acquired photoplethysmographic or hemodynamic signal. In Plot 110a', the photoplethysmographic signal is a time series signal having a signal voltage potential as a function of time as acquired from two light sources (e.g., infrared and red-light source). Plot 110b' shows an example cardiac signal comprising a 3-channel potential time series plot. In some embodiments, the biophysical signal capture system 102 preferably acquires biophysical signals via non-invasive means or component(s). In alternative embodiments, invasive or minimally-invasively means or component(s) may be used to supplement or as substitutes for the non-invasive means (e.g., implanted pressure sensors, chemical sensors, accelerometers, and the like). In still further alternative embodiments, non-invasive and non-contact probes or sensors capable of collecting biophysical signals may be used to supplement or as substitutes for the non-invasive and/or invasive/minimally invasive means, in any combination (e.g., passive thermometers, scanners, cameras, x-ray, magnetic, or other means of non-contact or contact energy data collection system as discussed herein). Subsequent to signal acquisitions and recording, the biophysical signal capture system 102 then provides, e.g., sending over a wireless or wired communication system and/or a network, the acquired biophysical-signal data set 110 (or a data set derived or processed therefrom, e.g., filtered or pre-processed data) to a data repository 112 (e.g., a cloud-based storage area network) of the assessment system 103. In some embodiments, the acquired biophysical-signal data set 110 is sent directly to the assessment system 103 for analysis or is uploaded to a data repository 112 through a secure clinician's portal.

Biophysical signal capture system 102 is configured with circuitries and computing hardware, software, firmware, middleware, etc., in some embodiments, to acquire, store, transmit, and optionally process both the captured biophysical signals to generate the biophysical-signal data set 110. An example biophysical signal capture system 102 and the acquired biophysical-signal set data 110 are described in U.S. Pat. No. 10,542,898, entitled "Method and Apparatus for Wide-Band Phase Gradient Signal Acquisition," or U.S. Patent Publication No. 2018/0249960, entitled "Method and Apparatus for Wide-Band Phase Gradient Signal Acquisition," each of which is hereby incorporated by reference herein in its entirety.

In some embodiments, biophysical signal capture system 102 includes two or more signal acquisition components, including a first signal acquisition component (not shown) to acquire the first biophysical signals (e.g., photoplethysmographic signals) and includes a second signal acquisition component (not shown) to acquire the second biophysical signals (e.g., cardiac signals). In some embodiments, the electrical signals are acquired at a multi-kilohertz rate for a few minutes, e.g., between 1 kHz and 10 kHz. In other embodiments, the electrical signals are acquired between 10 kHz and 100 kHz. The hemodynamic signals may be acquired, e.g., between 100 Hz and 1 kHz.

Biophysical signal capture system 102 may include one or more other signal acquisition components (e.g., sensors such as mechano-acoustic, ballistographic, ballistocardiographic, etc.) for acquiring signals. In other embodiments of the signal capture system 102, a signal acquisition component comprises conventional electrocardiogram (ECG/EKG) equipment (e.g., Holter device, 12 lead ECG, etc.).

Figure 12A:
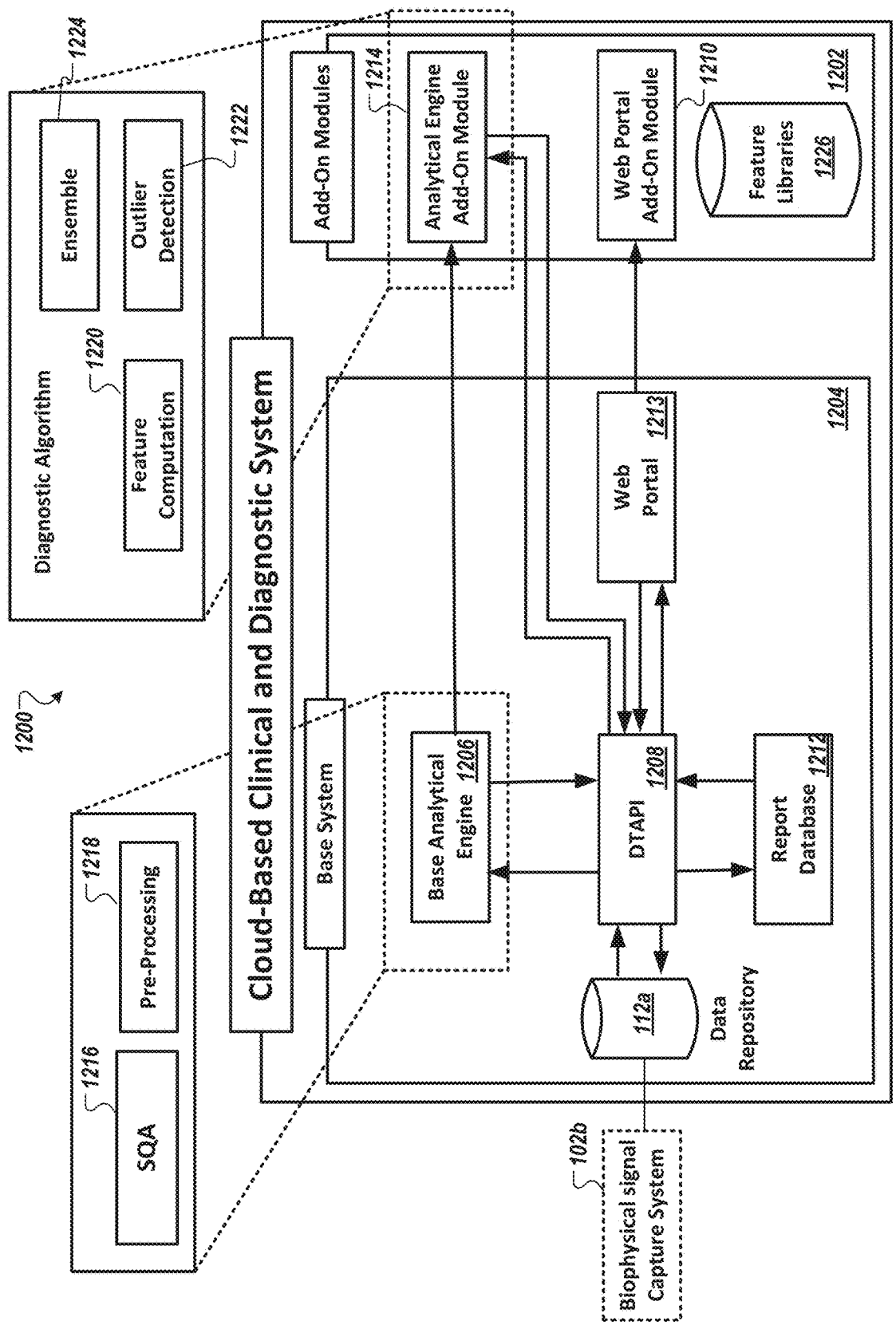
FIG. 12A shows a schematic diagram of an example clinical evaluation system configured to use conduction deviation features among other computed features to generate one or more metrics associated with the physiological state of a patient in accordance with an illustrative embodiment.
Figure 12B:
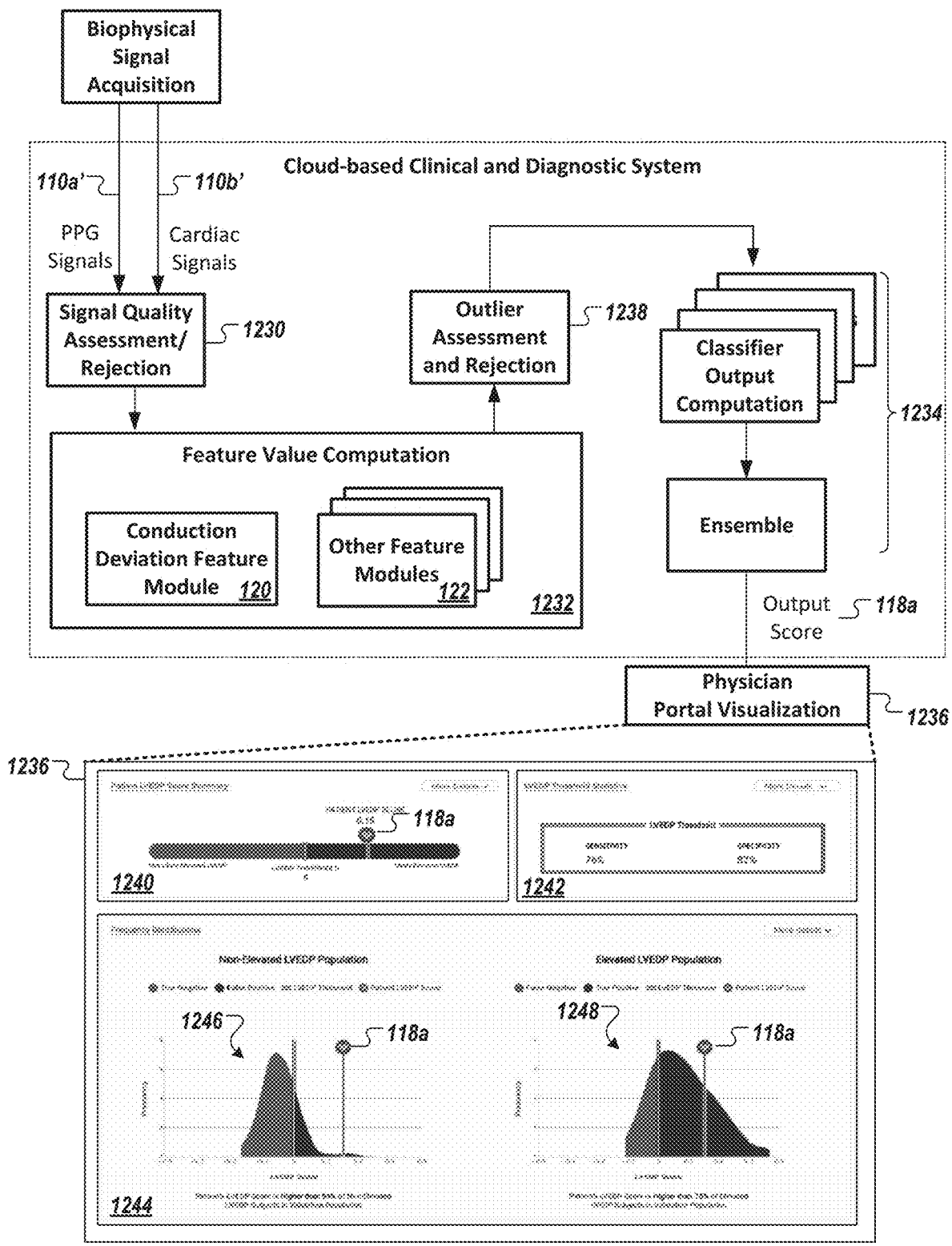
FIG. 12B shows a schematic diagram of the operation of the example clinical evaluation system of FIG. 12A in accordance with an illustrative embodiment.

Assessment system 103 comprises, in some embodiments, the data repository 112 and an analytical engine or analyzer (not shown—see FIGS. 12A and 12B). Assessment system 103 may include feature modules 114 and a classifier module 116 (e.g., an ML classifier module). In FIG. 1, Assessment system 103 is configured to retrieve the acquired biophysical signal data set 110, e.g., from the data repository 112, and use it in the feature modules 114, which is shown in FIG. 1 to include a conduction deviation feature module 120 and other modules 122 (later described herein). The features modules 114 compute values of features or parameters, including those of conduction deviation features, to provide to the classifier module 116, which computes an output 118, e.g., an output score, of the metrics associated with the physiological state of a patient (e.g., an indication of the presence or non-presence of a disease state, medical condition, or an indication of either). Output 118 is subsequently presented, in some embodiments, at a healthcare physician portal (not shown—see FIGS. 12A and 12B) to be used by healthcare professionals for the diagnosis and treatment of pathology or a medical condition. In some embodiments, a portal may be configured (e.g., tailored) for access by, e.g., patients, caregivers, researchers, etc., with output 118 configured for the portal's intended audience. Other data and information may also be a part of output 118 (e.g., the acquired biophysical signals or other patient's information and medical history).

Classifier module 116 (e.g., ML classifier module) may include transfer functions, look-up tables, models, or operators developed based on algorithms such as but not limited to decision trees, random forests, neural networks, linear models, Gaussian processes, nearest neighbor, SVMs, Naïve Bayes, etc. In some embodiments, classifier module 116 may include models that are developed based on ML techniques described in U.S. Provisional Patent Application No. 63/235,960, filed Aug. 23, 2021, entitled "Method and System to Non-Invasively Assess Elevated Left Ventricular End-Diastolic Pressure"; U.S. Patent Publication No. 20190026430, entitled "Discovering Novel Features to Use in Machine Learning Techniques, such as Machine Learning Techniques for Diagnosing Medical Conditions"; or U.S. Patent Publication No. 20190026431, entitled "Discovering Genomes to Use in Machine Learning Techniques," each of which is hereby incorporated by reference herein in its entirety.

Example Biophysical Signal Acquisition

Figure 2:
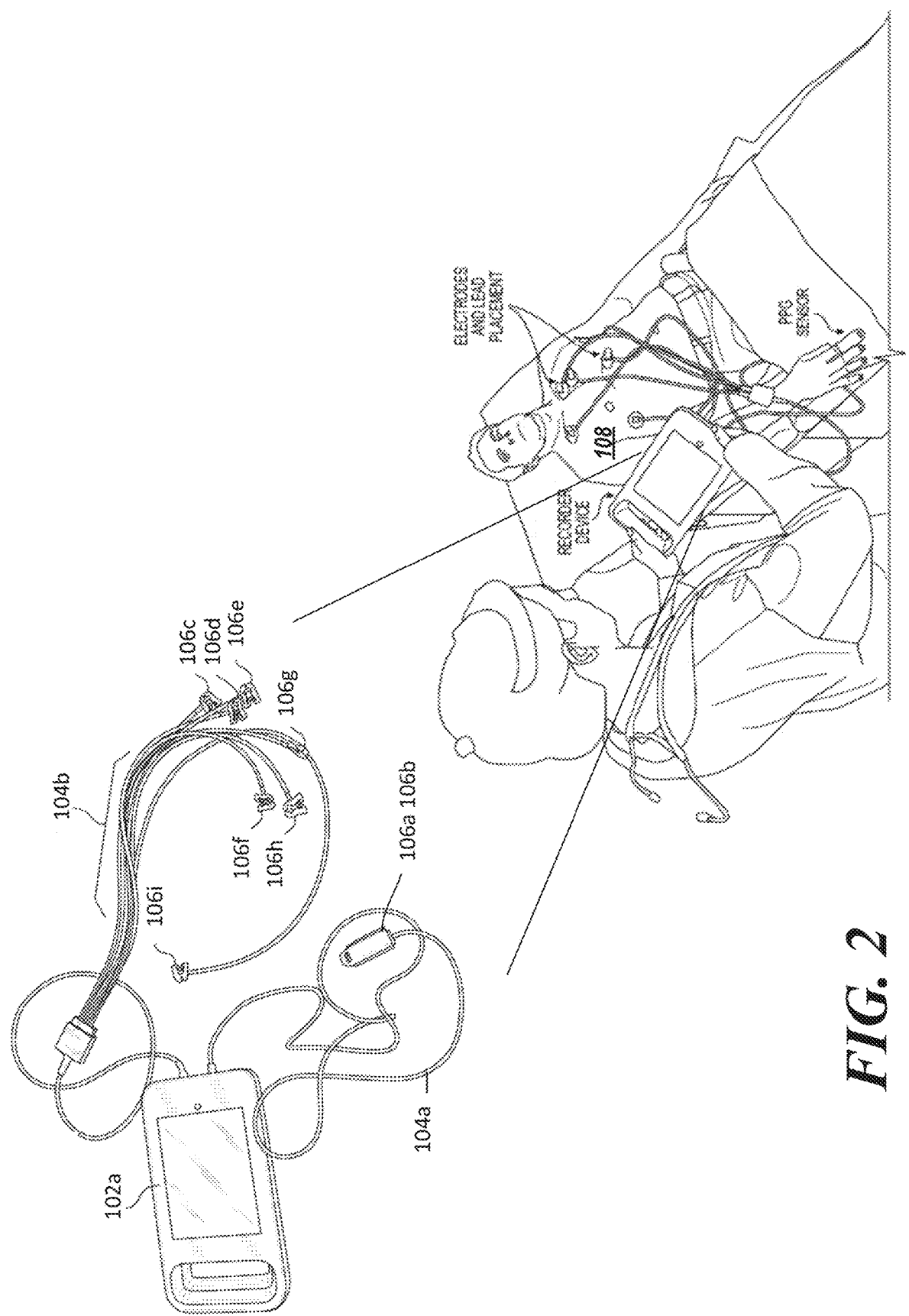
FIG. 2 shows an example biophysical signal capture system or component and its use in non-invasively collecting biophysical signals of a patient in a clinical setting in accordance with an illustrative embodiment.

FIG. 2 shows a biophysical signal capture system 102 (shown as 102a) and its use in non-invasively collecting biophysical signals of a patient in a clinical setting in accordance with an illustrative embodiment. In FIG. 2, the biophysical signal capture system 102a is configured to capture two types of biophysical signals from the patient 108 while the patient is at rest. The biophysical signal capture system 102a synchronously acquires the patient's (i) electrical signals (e.g., cardiac signals corresponding to the second biophysical-signal data set 110b) from the torso using orthogonally placed sensors (106c-106h; 106i is a $7^{th}$ common-mode reference lead) and (ii) hemodynamic signals (e.g., PPG signals corresponding to the first biophysical-signal data set 110a) from the finger using a photoplethysmographic sensor (e.g., collecting signals 106a, 106b).

As shown in FIG. 2, the electrical and hemodynamic signals (e.g., 104a, 104b) are passively collected via commercially available sensors applied to the patient's skin. The signals may be acquired beneficially without patient exposure to ionizing radiation or radiological contrast agents and without patient exercise or the use of pharmacologic stressors. The biophysical signal capture system 102a can be used in any setting conducive for a healthcare professional, such as a technician or nurse, to acquire the requisite data and where a cellular signal or Wi-Fi connection can be established.

The electrical signals (e.g., corresponding to the second biophysical signal data set 110b) are collected using three orthogonally paired surface electrodes arranged across the patient's chest and back along with a reference lead. The electrical signals are acquired, in some embodiments, using a low-pass anti-aliasing filter (e.g., ~2 kHz) at a multi-kilohertz rate (e.g., 8 thousand samples per second for each of the six channels) for a few minutes (e.g., 215 seconds). In alternative embodiments, the biophysical signals may be continuously/intermittently acquired for monitoring, and portions of the acquired signals are used for analysis. The hemodynamic signals (e.g., corresponding to the first biophysical signal data set 110a) are collected using a photoplethysmographic sensor placed on a finger. The photoabsorption of red light (e.g., any wavelengths between 600-750 nm) and infrared light (e.g., any wavelengths between 850-950 nm) are recorded, in some embodiments, at a rate of 500 samples per second over the same period. The biophysical signal capture system 102a may include a common mode drive that reduces common-mode environmental noise in the signal. The photoplethysmographic and cardiac signals were simultaneously acquired for each patient. Jitter (inter-modality jitter) in the data may be less than about 10 microseconds (μs). Jitter among the cardiac signal channels may be less than 10 microseconds, e.g., around ten femtoseconds (fs).

A signal data package containing the patient metadata and signal data may be compiled at the completion of the signal acquisition procedure. This data package may be encrypted before the biophysical signal capture system 102a transfers the package to the data repository 112. In some embodiments, the data package is transferred to the assessment system (e.g., 103). The transfer is initiated, in some embodiments, following the completion of the signal acquisition procedure without any user intervention. The data repository 112 is hosted, in some embodiments, on a cloud storage service that can provide secure, redundant, cloud-based storage for the patient's data packages, e.g., Amazon Simple Storage Service (i.e., "Amazon S3"). The biophysical signal capture system 102a also provides an interface for the practitioner to receive notification of an improper signal acquisition to alert the practitioner to immediately acquire additional data from the patient.

Example Method of Operation

Figure 3A:
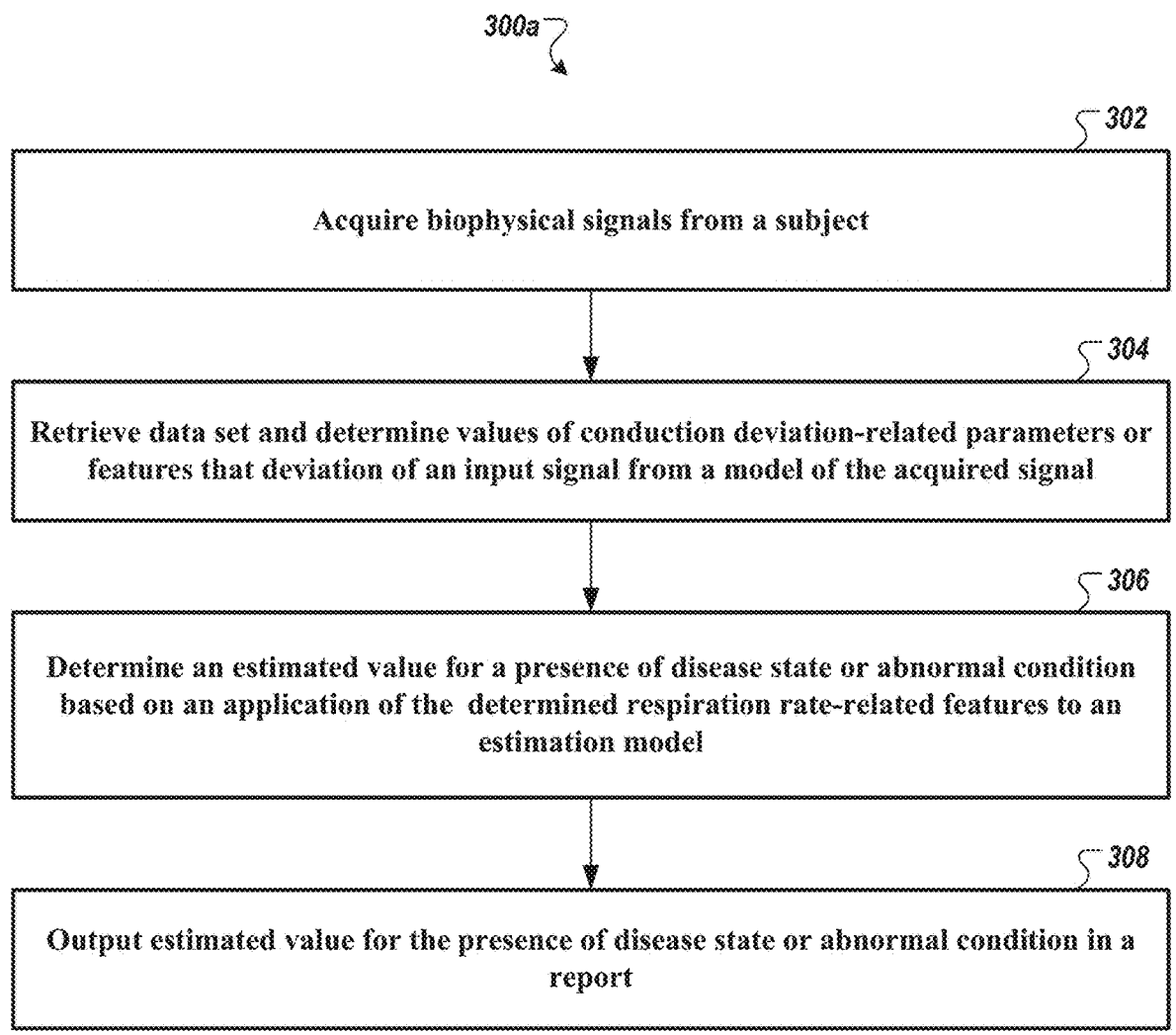
FIGS. 3A-3B each shows an example method to use conduction deviation features/parameters or their intermediate data in a practical application for diagnostics, treatment, monitoring, or tracking.
Figure 3B:
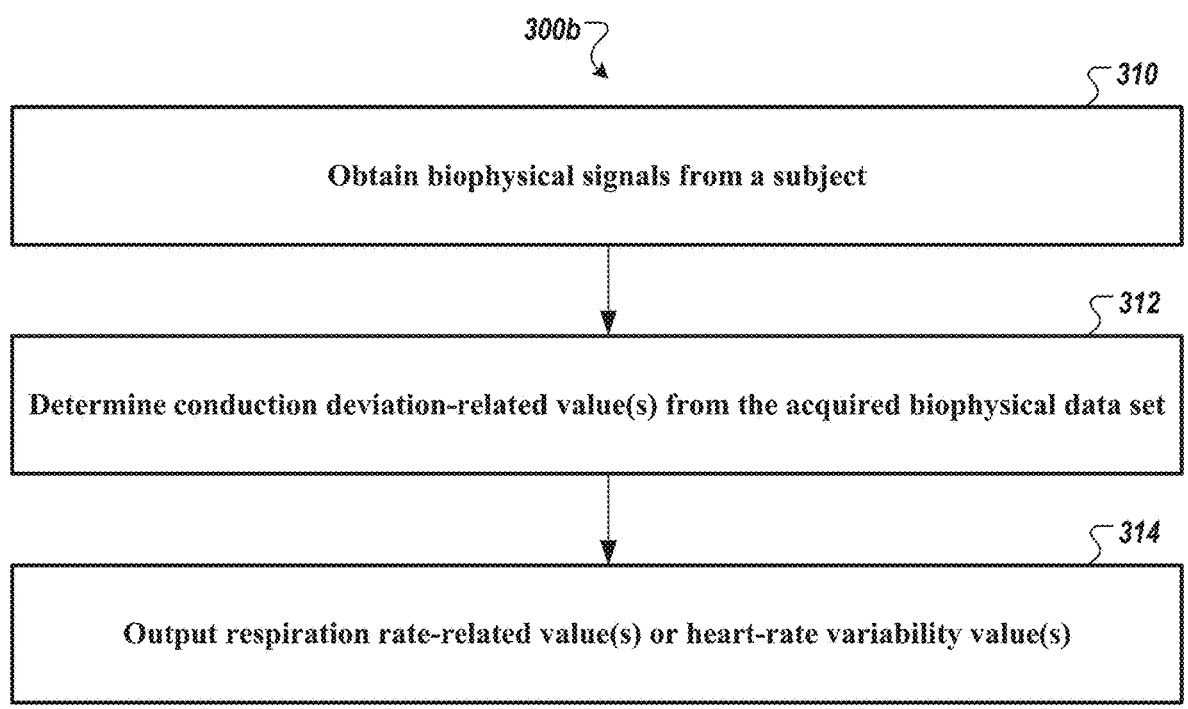

FIGS. 3A-3B each shows an example method to use conduction deviation features or their intermediate outputs in a practical application for diagnostics, treatment, monitoring, or tracking.

Estimation of Presence of Disease State or Indicating Condition. FIG. 3A shows a method 300a that employs conduction deviation-related parameters or features to determine estimators of the presence of a disease state, medical condition, or indication of either, e.g., to aid in the diagnosis, tracking, or treatment. Method 300a includes the step of acquiring (302) biophysical signals from a patient (e.g., cardiac signals, photoplethysmographic signals, ballistocardiographic signals), e.g., as described in relation to FIGS. 1 and 2 and other examples as described herein. In some embodiments, the acquired biophysical signals are transmitted for remote storage and analysis. In other embodiments, the acquired biophysical signals are stored and analyzed locally.

As stated above, one example in the cardiac context is the estimation of the presence of abnormal left-ventricular end-diastolic pressure (LVEDP) or mean pulmonary artery pressure (mPAP), significant coronary artery disease (CAD), abnormal left ventricular ejection fraction (LVEF), and one or more forms of pulmonary hypertension (PH), such as pulmonary arterial hypertension (PAH). Other pathologies or indicating conditions that may be estimated include, e.g., one or more forms of heart failure such as, e.g., heart failure with preserved ejection fraction (HFpEF), arrhythmia, congestive heart failure, valve failure, among various other diseases and medical conditions disclosed herein.

Method 300a further includes the step of retrieving (304) the data set and determining values of conduction deviation features that quantify the deviation of an input signal (e.g., a biophysical signal such as cardiac signals) from a model of the acquired signal in a lower-dimensional subspace. Example operations to determine the values of conduction deviation-based features are provided in relation to FIGS. 4-11 later discussed herein. Method 300a further includes the step of determining (306) an estimated value for a presence of a disease state, medical condition, or an indication of either based on an application of the determined conduction deviation features to an estimation model (e.g., ML models). An example implementation is provided in relation to FIGS. 12A and 12B.

Method 300a further includes the step of outputting (308) estimated value(s) for the presence of disease state or abnormal condition in a report (e.g., to be used diagnosis or treatment of the disease state, medical condition, or indication of either), e.g., as described in relation to FIGS. 1, 12A, and 12B and other examples described herein.

Diagnostics or Condition Monitoring or Tracking using Conduction Deviation Features or Parameters. FIG. 3B shows a method 300b that employs conduction deviation features or parameters or features for monitoring or controls of medical equipment or health monitoring device. Method 300b includes the step of obtaining (302) biophysical signals from a patient (e.g., cardiac signals, photoplethysmographic signals, ballistocardiographic signals, etc.). The operation may be performed continuously or intermittently, e.g., to provide output for a report or as controls for the medical equipment or the health monitoring device.

Method 300b further includes determining (310) conduction deviation features or from the acquired biophysical data set, e.g., as described in relation to FIGS. 4-11. The determination based may be based on an analysis of the continuously acquired signals over a moving window.

Method 300b further includes outputting (312) conduction deviation features or parameters (e.g., in a report for use in diagnostics or as signals for controls). For monitoring and tracking, the output may be via a wearable device, a handheld device, or medical diagnostic equipment (e.g., pulse oximeter system, wearable health monitoring systems) to provide augmented data associated with health. In some embodiments, the outputs may be used in resuscitation systems, cardiac or pulmonary stress test equipment, and pacemakers.

Ventricular-Depolarization Conduction-Deviation Analysis

Figure 4:
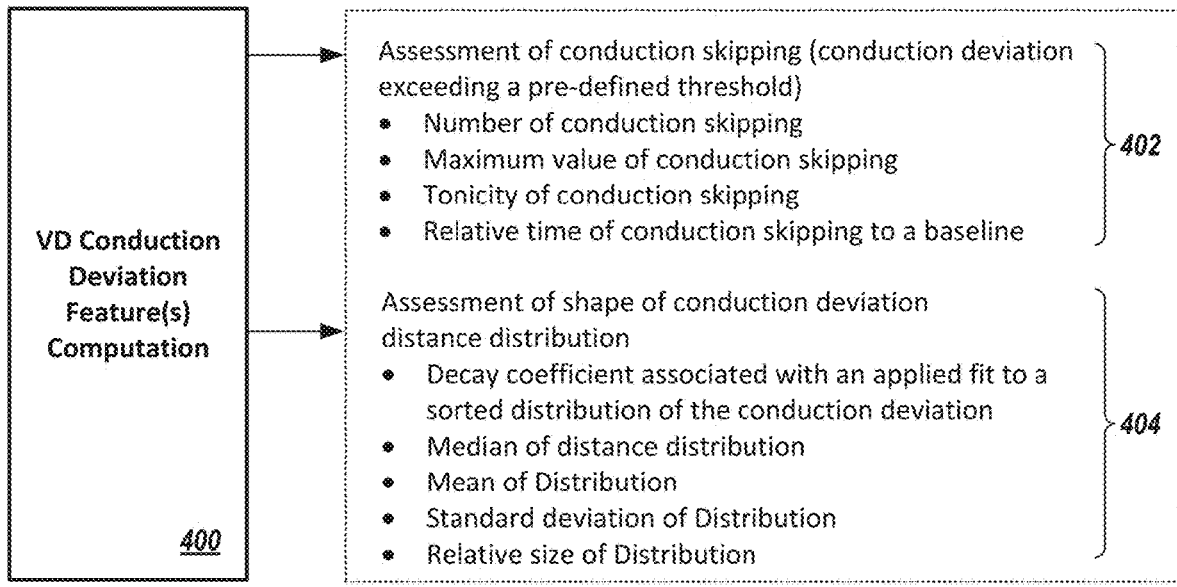
FIG. 4 illustrates an example ventricular depolarization conduction deviation feature computation module configured to determine values of VD conduction deviation associated properties of one or more acquired biophysical signals in accordance with an illustrative embodiment.
Figure 5:
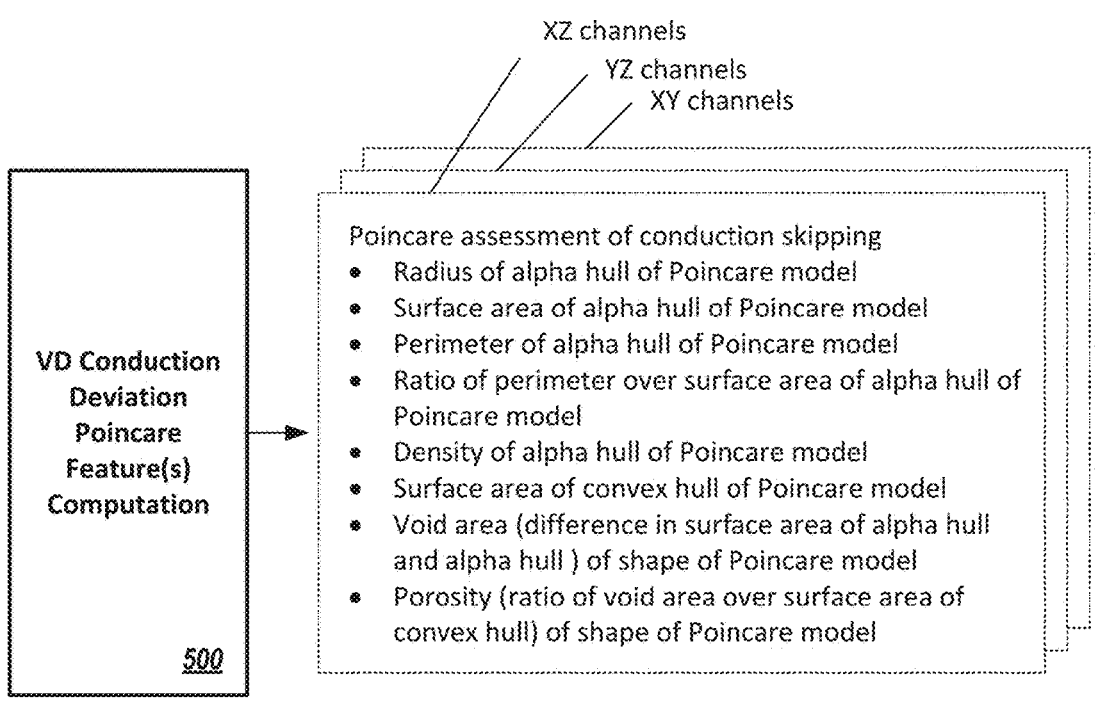
FIG. 5 illustrates an example ventricular depolarization conduction deviation Poincaré feature computation module configured to determine values of a Poincaré model derived from VD conduction deviation associated properties of one or more acquired biophysical signals in accordance with an illustrative embodiment.

FIGS. 4 and 5 each shows an example conduction deviation analysis feature computation module, for a total of two example modules configured to determine values of conductive deviation features or parameters of biophysical signals in accordance with an illustrative embodiment. The VD conduction deviation feature(s) computation module 400 can calculate assessments of conductive skipping, including the number of conduction skipping, the maximum number of conduction skipping, the tonicity of conduction skipping, and the relative time of conduction skipping to a baseline. The module 400 may further calculate an assessment of the shape of conduction deviation distance distribution, including the decay coefficient associated with an applied fit to a sorted distribution of the conduction deviation, the median of distance distribution, the mean of the distribution, the standard deviation of the distribution, and the relative size of the distribution. The VD conduction deviation Poincaré feature(s) computation module 600 may determine a Poincaré assessment of conduction skipping on the XY, YZ, and XZ channels. The assessment may include determining values including the radius of the alpha hull of the Poincaré model, the surface area of the alpha hull of a Poincaré model, the perimeter of the alpha hull of the Poincaré model, the ratio of perimeter over a surface area of the alpha hull of Poincaré model, the density of alpha hull of Poincaré model, the surface area of the convex hull of Poincaré model, void area (difference in surface area of alpha hull and alpha hull) of the shape of Poincaré model, and porosity (ratio of the void area over the surface area of convex hull) of the shape of Poincaré model.

Conduction deviations may be defined as the spatial deviations of an acquired signal from a modeled signal in the phase space. The model can represent the acquired signal (an array with a dimension 3×N) in a reduced space (an array with a dimension 3×M, where M<N) that captures fundamental characteristics of the signal to which a residue between the model and the acquired signal can be generated. To this end, the model can be considered as a dimensionally reduced signal that aims to retain the important information embedded in the signal while ignoring higher-dimensional information.

Multi-Dimensional Fourier Decomposer (MDFD) is used, in some embodiments, to model the cardiac signal. Other signal modeling methods may be used, including sparse decomposition algorithms such as Matching Pursuit, Orthogonal Matching Pursuit, Lasso, Fast Orthogonal Search, among others.

Signal Modeling with Multi-Dimensional Fourier Decomposer (MDFD)

MDFD is a Fourier-based algorithm that can decompose a multi-dimensional time series (MDTS) by an iterative selection of candidate terms that, collectively, form a subspace signal model.

Figure 6:
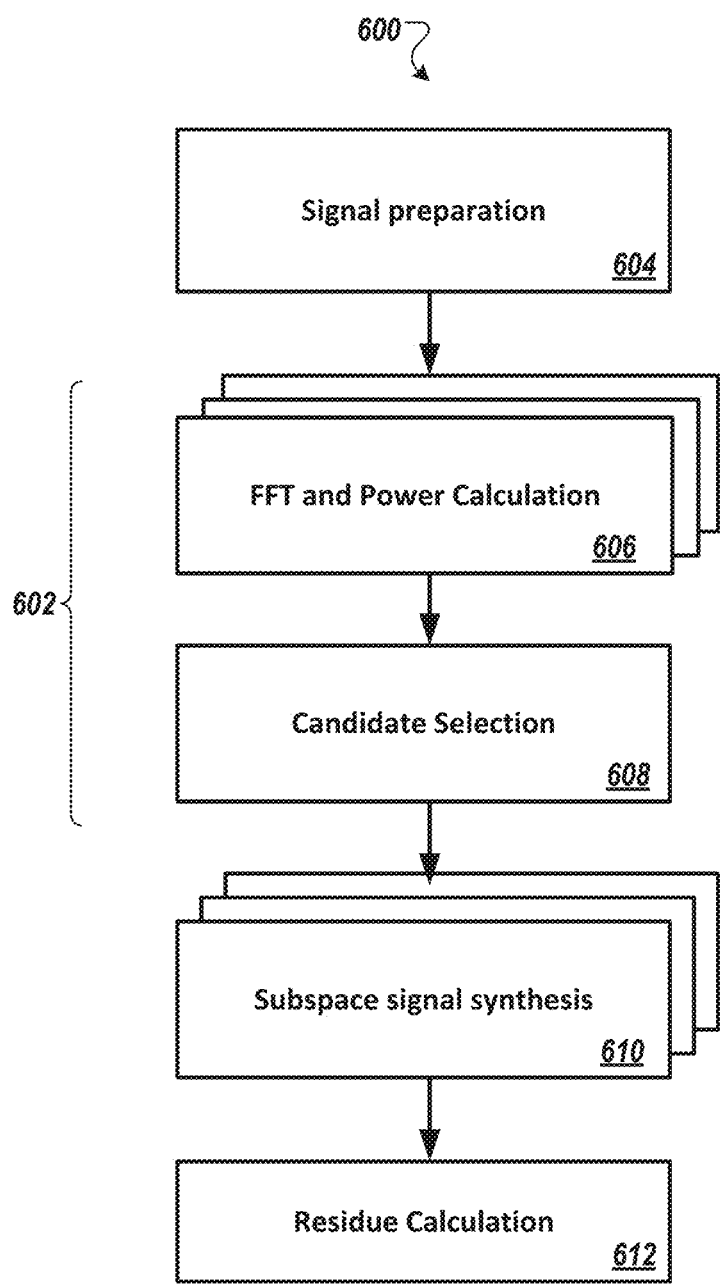
FIG. 6 shows an example method of modeling a biophysical signal using a signal decomposition operation in accordance with an illustrative embodiment.

FIG. 6 shows an example method 600 of modeling a biophysical signal using a signal estimation operation 402 (e.g., Multi-Dimensional Fourier Decomposer) in accordance with an illustrative embodiment. In FIG. 6, method 600 may include signal preparation operation 604 (e.g., via a pre-processing module) configured to remove transient time (to provide a sub-signal for the analysis), remove baseline wander, and down-sample the acquired biophysical signal.

The Multi-Dimensional Fourier Decomposer 602 may decompose 606 a given signal to its frequency components by evaluating each candidate basis (e.g., complex orthogonal sine and cosine pairs, exponential, complex basis, etc.) based on a Fast Fourier function and on its power. The decomposer 602 may first apply 606 the Fast Fourier function to the preprocessed signal to determine complex Fourier coefficients. The FFT is calculated once, and the selections are made based on the calculation. In some embodiments, the candidate basis as complex Fourier coefficients are pairwise basis defined as $a \cdot \cos(\pi \omega t)$ and $b \cdot \sin(\pi \omega t)$, where $\omega$ is the frequency and $a$ and $b$ are calculated coefficients associated with the power of that frequency.

To improve computation efficiency, method 600, in some embodiments, is configured to limit the number of orthogonal bases (also referred to as candidates) to be smaller than the original dimension of the input signal. Assume the dimension of the input signal is equal to the number of data points in the signal (N). And, Given the dimension of the signal and the sampling frequency ($f_s$), the number of candidates (M) can be calculated based on the model cut-off frequency ($f_{cut-off}$), per Equation 1.

$$M = N\left(\frac{f_{cut-off}}{f_s}\right) \quad \text{(Eq. 1)}$$

In Equation 1, $f_{cut-off} < f_s$ can be applied to create a subspace with a smaller dimension than the input signal, M<N while still sufficient to acquire the main frequency components. The cut-off frequency can be determined by experimentation that evaluates the different cut-off frequencies and determining if there is any change (e.g., in power or SNR) in the resulting residue of method 600. In some embodiments, a cut-off frequency of 40 Hz is used as a low pass filter for modeling the signal. A change in the cut-off frequency may change the residue distribution, so the cut-off frequency should be selected based on a few exemplar signals. In an example, for a preprocessed signal with 1 KHz sampling frequency and a dimension of 183000×3 (which would correspond to a signal with 183 seconds in length), the use of a cut-off frequency of 40 Hz results in a signal would reduce the dimension of signals to 7321×3 (i.e., by a reduction of 25× from 1000 Hz/40 Hz). And, with 7321×3 pairwise candidates, the MDFD algorithm may use 14642 non-paired sinc and cosine candidates to model the signal set.

Method 600 may select 608 candidates based on a calculated power for a given frequency. To further reduce the dimension of the signal, operation 608 may limit the energy subspace to contain the top percentile of the energy of the signal through the selection of the candidates in the frequency domain. The Fourier space (Fourier coefficient and frequency) is sorted, in some embodiments, with respect to the power of the signal, and a subset of candidates associated with 80% subspace energy is selected.

Once the candidate bases are selected, method 600 may synthesize 610 a subspace model by constructing an augmented mirrored matrix of complex Fourier coefficients. During the construction of the complex Fourier coefficient matrix, any coefficient associated with the selected frequencies may be preserved while the coefficients for non-selected frequencies are set to zero. When doing the inverse FFT, the symmetrical augmented matrix of FFT coefficients is generated with respect to Nyquist frequency so that the complex Fourier coefficients have the same real part and the negative imaginary part. For example, if the Nyquist is 100, then the mirrored coefficients are at 90 and 110, which are the conjugates of each.

Method 600 may perform 612 an inverse FFT to synthesize a time-series multi-channel estimated signal of the acquired signals and calculate a residue between the time-series multi-channel estimated signal and the acquired signal. Features may be extracted from portions of and analysis applied to the residue.

The MDFD algorithm may be adjustable by model input parameters, e.g., by down sample frequency, candidate pool minimum frequency or interval, candidate pool maximum frequency, model duration, model starting point, and point-cloud model duration, among others. Table 1 lists examples of MDFD input parameters and their values used to model the signals and generate conduction deviation features in some embodiments discussed herein.

TABLE 1

| DOWNSAMPLE_FS | down sample frequency | 1000 Hz |
|---|---|---|
| MODEL_FREQUENCY_MIN | candidate pool minimum frequency | 0.01 Hz |

TABLE 1-continued

| MODEL_FREQUENCY_MAX | candidate pool maximum frequency | 30 Hz |
|---|---|---|
| MODEL_DURATION | duration of the modeled signal | 100 s |
| MODEL_JUMP_SIZE | modeling start point | 31 s |
| Point Cloud Model Duration | Duration to model the signal and create the conduction deviations point cloud | 20 s |

Figure 7A:
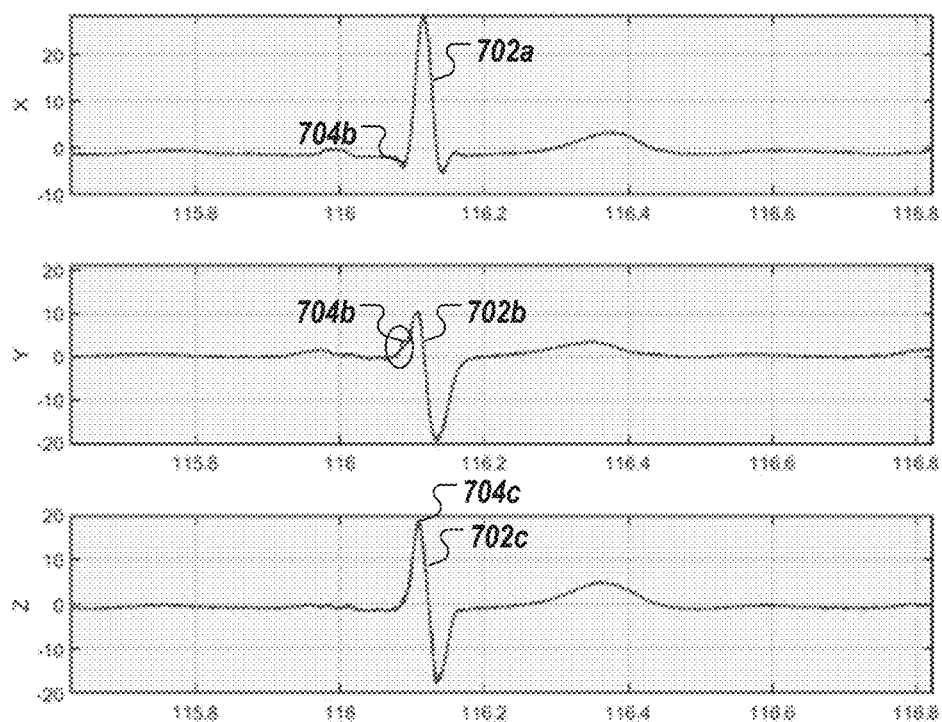
FIG. 7A are plots showing estimated model signals for the three channels of an example cardiac signal generated by the signal estimation method of FIG. 4 in relation to the source input signal in accordance with an illustrative embodiment.
Figure 7B:
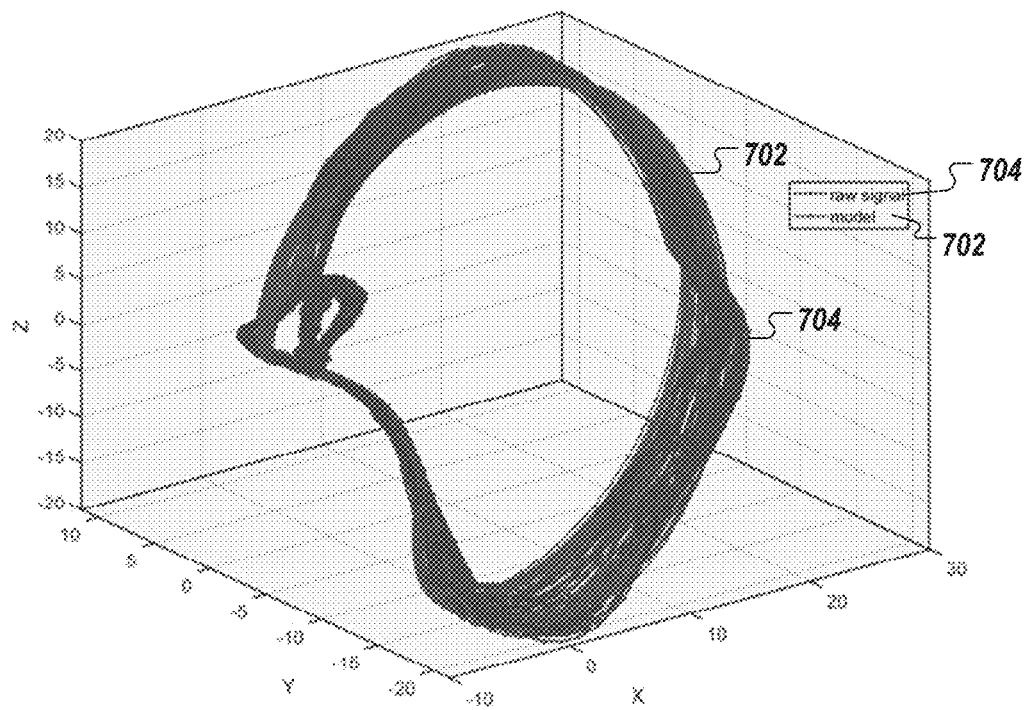
FIG. 7B shows the model signal and sample signal of FIG. 5A in phase space in accordance with an illustrative embodiment.

FIG. 7A are plots showing estimated model signals 702 (shown as 702a, 702b, 702c) for the three channels of the cardiac signal, in this example, generated by the signal estimation method of FIG. 6 (e.g., by the MDFD) in relation to the source input signal 704 in accordance with an illustrative embodiment. FIG. 7B shows the same model signal 702 and sample signal 704 (pre-processed and shown as "raw signal") in phase space (i.e., phase space coordinate system) where each axis corresponds to the three channels of the acquired cardiac signal, in this example.

In FIGS. 7A and 7B, it can be observed that method 600 (e.g., MDFD) can sufficiently and effectively capture the morphology of the waveforms, both in the time domain and phase space subspace. Notably, notches and fluctuations (e.g., shown proximal to 704b) corresponding to high-frequency activities can be observed not to be modeled. These differences between signal 704 and model 702 represent conduction deviations, which can be efficiently captured as a residue between signal 704 and model 702.

Figure 7C:
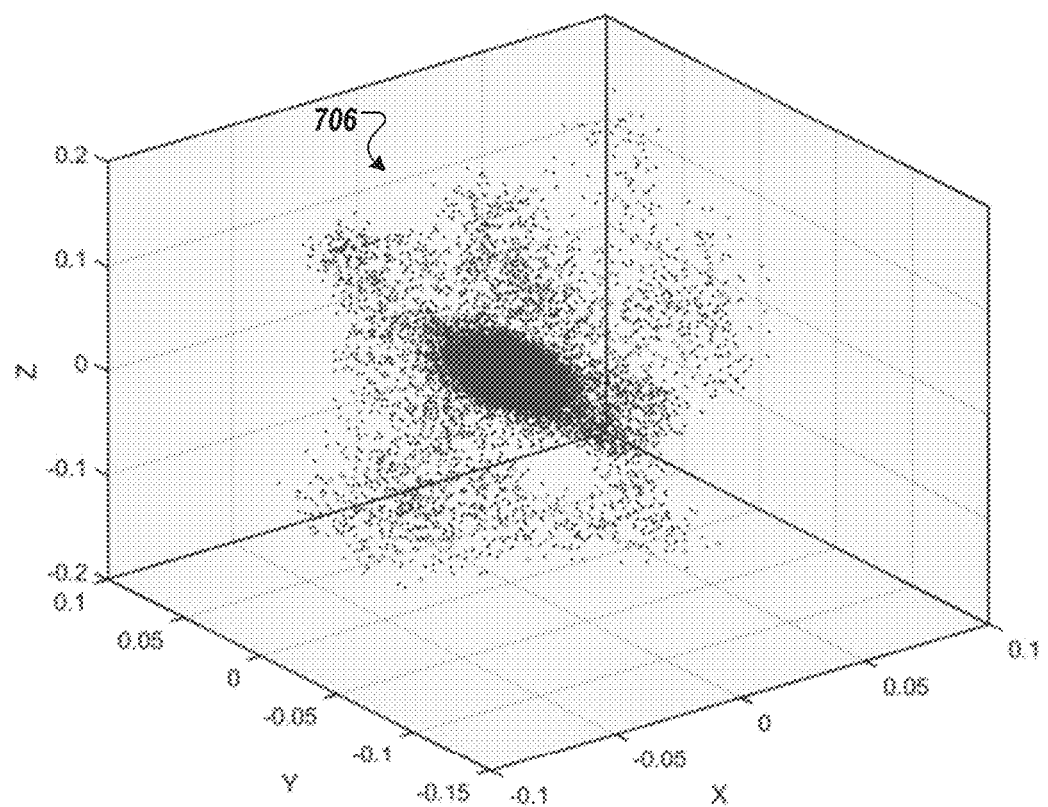
FIG. 7C shows a phase space 3D-scatter plot of a residue point-cloud model corresponding to the ventricular-depolarization conduction-deviation.

FIG. 7C shows a phase space 3D-scatter plot of a residue point-cloud model 706 corresponding to the ventricular-depolarization conduction-deviation. In FIG. 7C, a conduction deviation point cloud (y') is constructed as a difference between the input signal (y) (e.g., 704) and the model (ȳ), for each corresponding set of channels, at any corresponding data point in the phase space per Equation 2.

$$y' = y - \bar{y} \quad \text{(Eq. 2)}$$

A higher accuracy model that more resembles the input signal with greater details can be achieved by increasing the number of candidates; however, this may result in less information residing in the residue and subsequent conduction deviations analysis. Using 80% of the top energy candidate signals in the MDFD algorithms was observed to provide a robust trade-off between the model accuracy and conduction deviations, though other percentile may be used (e.g., any percentile between 50% and 99%, e.g., 50%, 55%, 60%, 65%, 70%, 75%, 80%, 85%, 90%, 95%, 97.5%, 99%). The use of the residue in the subsequent analysis facilitates the computation-efficient quantification of lower energy quasi-periodic components in the input signals that may be indicative of abnormal conduction of the ventricular depolarization and which generally require more computation resources to model or may not be modeled at all (e.g., having chaotic components).

In some embodiments, method 600 includes calculating a derivative of the model. To improve computational efficiency, the derivative may be performed in the frequency domain (rather than in the time domain) by multiplying the terms of the model by $i2\pi f_i$. It can be mathematically proven that the time derivative of discrete signal $y^N(n)$ can be alternatively obtained in the frequency domain by Equations 3 and 4.

$$y^N(n) = \frac{1}{N}\sum_{i=n}^{N} Y(f_i)e^{i2\pi f_i t} \quad \text{(Eq. 3)}$$

-continued $$\lim_{\Delta n \to 0} \frac{y^N(n+\Delta n) - y^N(n)}{\Delta n} = \frac{1}{N}\sum_{i=n}^{N} i2\pi f_i Y(f_i)e^{j2\pi f_i t} \quad \text{(Eq. 4)}$$

Therefore, the multiplication of the factor $i2\pi f_i$ in the frequency domain, and then an inverse FFT can provide similar results as taking derivative of signal in the time domain but with a very high computational efficiency. In some embodiments, the derivative information is used to color the resulting phase space model. In other embodiments, the derivative information is used as part of an extracted feature.

Ventricular Depolarization Conduction Deviation Features Example #1

FIG. 4 illustrates, as the first of two example feature or parameter categories, an example ventricular depolarization conduction deviation feature computation module 400 configured to determine values of VD conduction deviation associated properties of one or more acquired biophysical signals in accordance with an illustrative embodiment. As shown in FIG. 4, the ventricular depolarization conduction deviation feature computation module 400 may output assessments of conduction skipping 402 and/or assessments of the shape of the conduction deviation distance distribution 404. Conduction skipping (associated with 402) refers to significant conduction deviations relative to the ventricular depolarization energy. In FIG. 4, the ventricular depolarization conduction deviation feature computation module 400 is configured to provide features associated with the number of detected conduction skipping, the maximum value of the conduction skipping, the tonicity of the conduction skipping, and the relative time between the conduction skipping and a baseline.

Figure 8A:
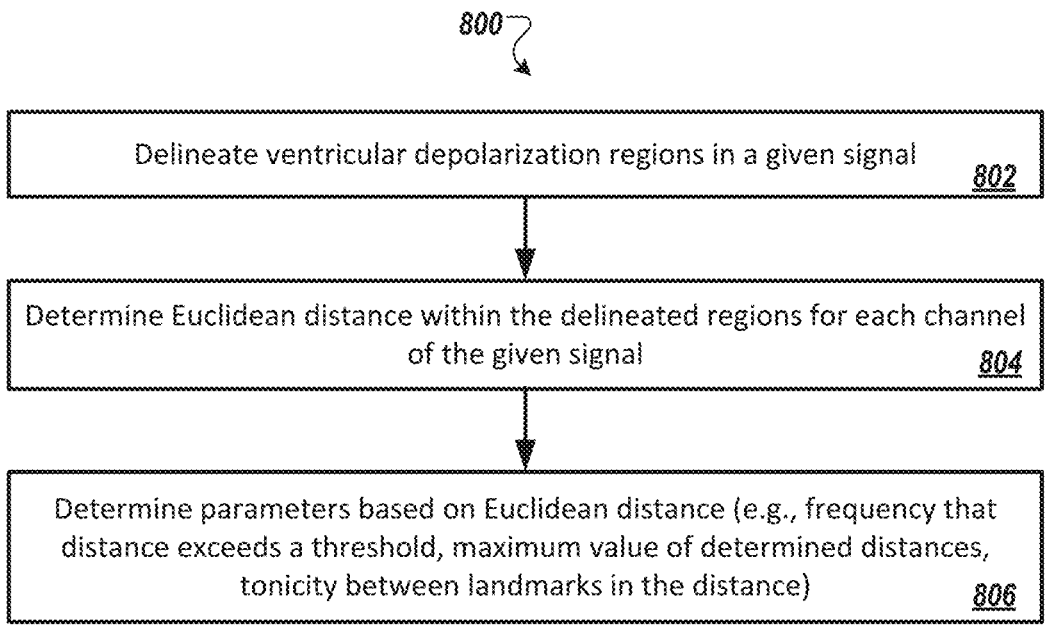
FIGS. 8A, 8B, and 8C each shows an example method to assess the ventricular depolarization conduction deviation feature of the module of FIG. 6 in accordance with an illustrative embodiment.
Figure 8B:
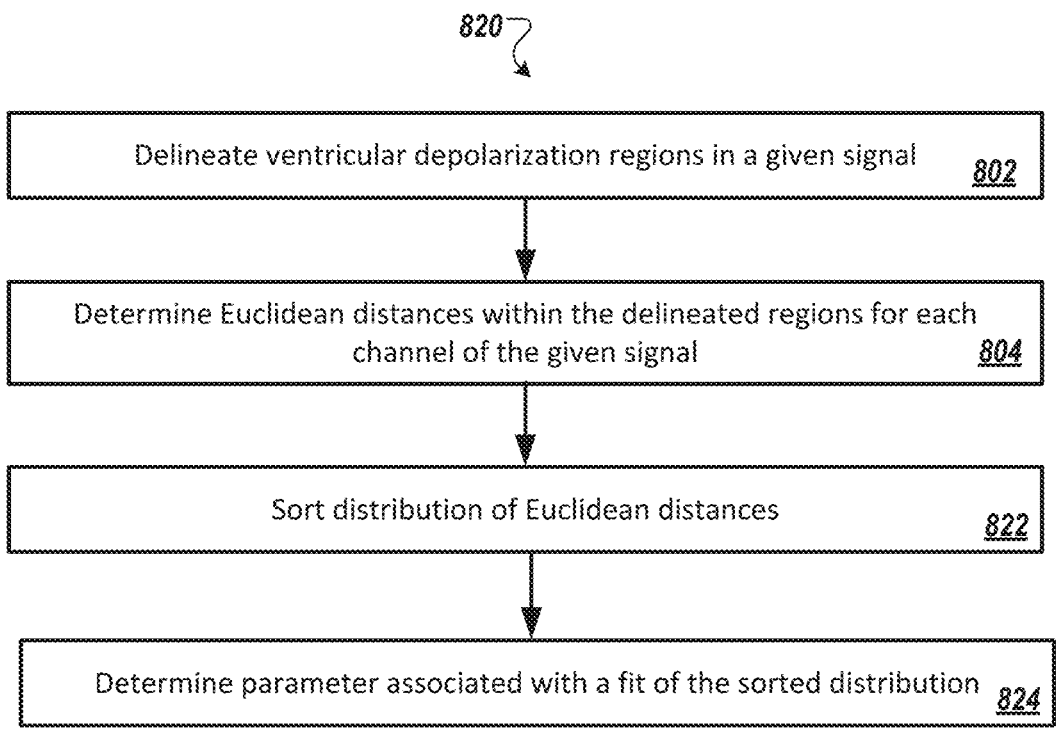
Figure 8C:
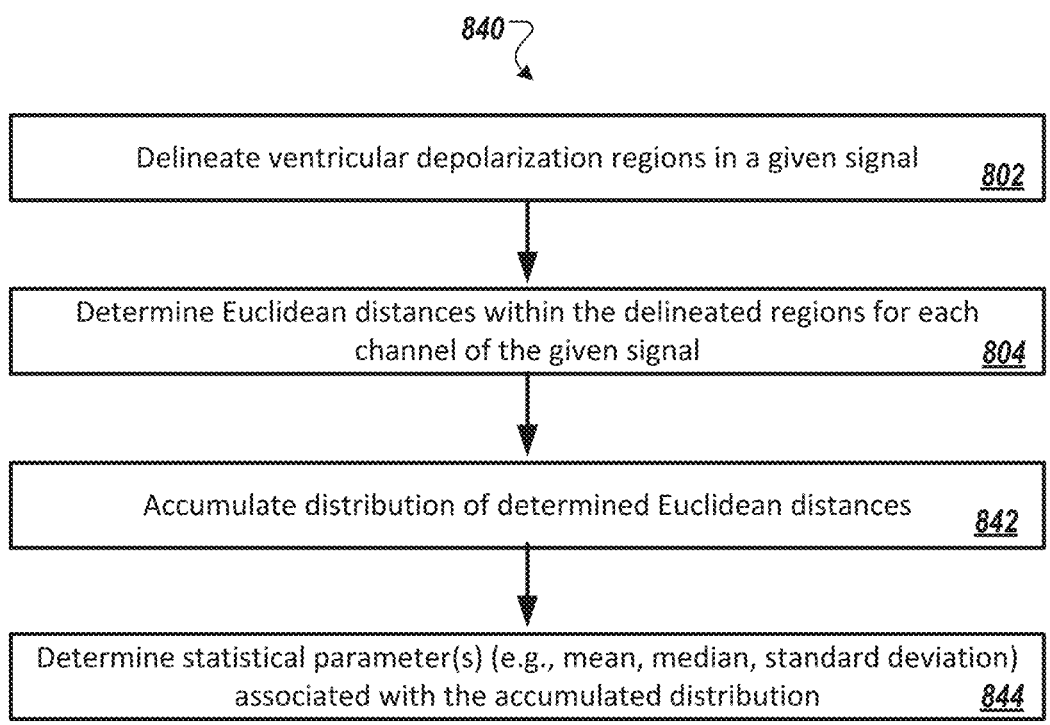

FIG. 8A shows an example method 800 to assess conduction skipping features 602 in a given signal. FIGS. 8B and 8C each shows an example method (920 and 940, respectively) to assess shapes of conduction deviation distance distribution as features 604 for a given signal.

To identify conduction skipping, method 800 (FIG. 8A) may include the step of isolating (802) ventricular depolarization regions for each heart cycle (i.e., heartbeat), in a calculated residue point cloud, for example, as generated according to the description of FIG. 6. In some embodiments, method 800 may detect the ventricular depolarization onset (also referred to as QRS onset) and the ventricular depolarization offset (also referred to as QRS offset) in each cardiac cycle by performing the Pan Tompkins operation to detect peaks in a time-series data set of the cardiac cycle and establish a band around the determined peak. The isolated region in the time series data can be indexed to corresponding data in phase space.

Method 800 then includes assessing (804) Euclidean distances for data points associated with ventricular depolarization. In some embodiments, the Euclidean distance may be determined as the amplitude of the largest three-dimensional vector determined between the signal and the estimated model of the signal in phase space. Then parameters associated with the Euclidean distance may be determined (806). For cycle M, conduction deviation distance ($D_M$) may be calculated per Equation 5.

$$D_M = \sqrt{(y'_{X,M})^2 + (y'_{Y,M})^2 + (Y'_{Z,M})^2} \quad \text{(Eq. 5)}$$

Table 2 shows an example set of VD conduction deviation features and their corresponding description. In Table 2, at least one feature type (see "*" in Table 2) has been observed to have significant utility in the assessment of the presence or non-presence of at least one cardiac disease or condition-specifically, the determination of presence or non-presence of elevated LVEDP. It has also been observed through experimentation that at least one feature type (see "**" in Table 2) has significant utility in the assessment of the presence or non-presence of coronary artery disease. The list of the specific features determined to have significant utility in the assessment of the presence or non-presence of abnormal or elevated LVEDP is provided in Table 5 and the presence or non-presence of significant CAD is provided in Table 6.

TABLE 2

| Feature name | Feature Description |
|---|---|
| numCondSkip | Number of conduction skipping |
| maxCondDist** | Maximum value for the conduction distance |
| maxSkipTime | The relative time index of maximum conduction skipping is a normalized time originating from the start of the QRS and ending at the conclusion of the QRS (from 0-1). |
| skipTonocity | Tonicity of the skipping peaks. Firstly, "skipping peaks" are peaks in the time series created by calculating the distance between the model and the signal and represent particularly prominent distances. Tonicity is a measure of increasing or decreasing trend in the amplitude of the detected peaks in that distance time series. If the tonicity is zero, then the peak amplitude is either constantly increasing or constantly decreasing over time. If tonicity is one, there's one change in the trend (from increasing to decreasing, or vice versa); if two, there are two changes in the trend (from increasing to decreasing to increasing, or vice versa). |
| decayCoefCondDist | Decay coefficient (c) obtained from the exponential fit $y_{fit} = ce^{-\alpha t}$ to the conduction deviation distance |
| decayRateCondDist** | Decay rate ($\alpha$) of the exponential fit $y_{fit} = ce^{-\alpha t}$ obtained from the exponential fit to the sorted conduction deviation distance |
| medianCondDelay_3D | Median of the accumulative conduction distance ($\Sigma_{i=1}^N D_{i,M}$) |
| stdCondDelay_3D | The standard deviation of the accumulative conduction distance |
| stdCondDelay_X** | The standard deviation of the accumulative conduction skipping in channel X |
| stdCondDelay_Y | The standard deviation of the accumulative conduction skipping in channel Y |

TABLE 2-continued

| Feature name | Feature Description |
| --- | --- |
| stdCondDelay_Z** | The standard deviation of the accumulative conduction skipping in channel Z |
| relCondDelay_X** | The ratio of accumulative conduction skipping X to total accumulative conduction distance |
| relCondDelay_Y | The ratio of accumulative conduction skipping Y to total accumulative conduction distance |
| relCondDelay_Z* | The ratio of accumulative conduction skipping Z to total accumulative conduction distance |

As described in the example of Table 2, the number of conduction skipping (feature "numCondSkip") is assessed as a frequency or number that an assessed peak in the ventricular depolarization region of the signal exceeds a pre-defined threshold. All the conduction skipping analyses (including this feature) can be performed in the three-dimensional space created by the amplitude data from the three cardiac vectors. The maximum value of the conduction skipping ("maxCondDist") can be assessed as the amplitude value of the maximum assessed peak.

Figure 9A:
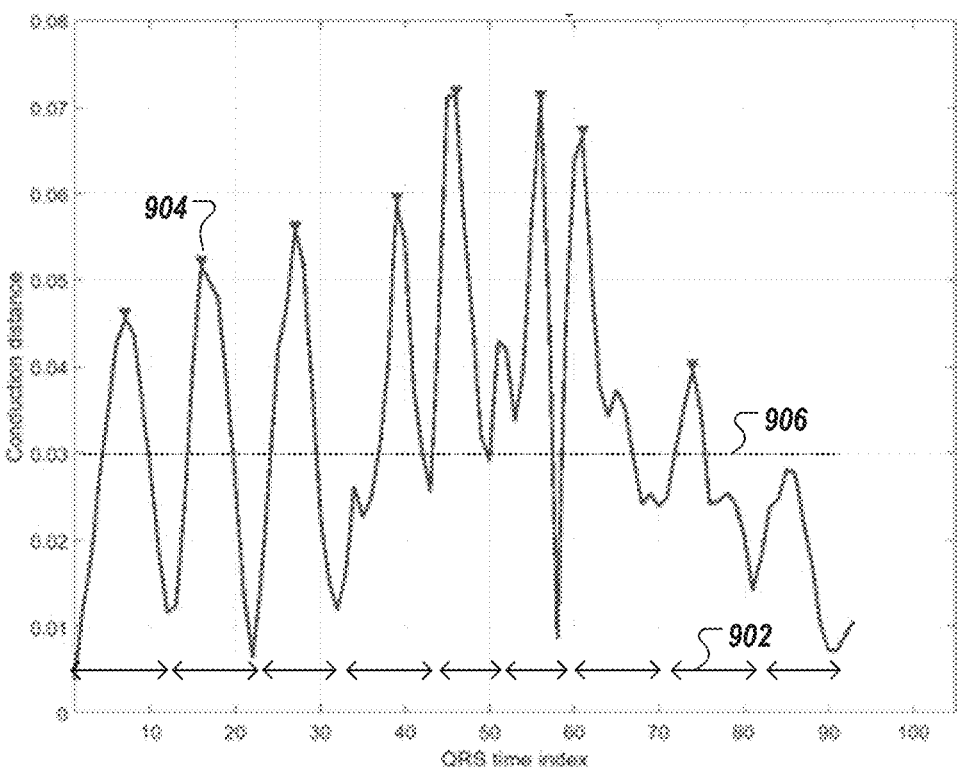
FIG. 9A shows an example of calculated conduction deviation distances of isolated ventricular depolarization regions of the signal used by the ventricular depolarization conduction deviation feature computation module of FIG. 6 in accordance with an illustrative embodiment.

FIG. 9A shows calculated conduction deviation distances (in the y-axis) of isolated ventricular depolarization regions of the signal. The x-axis shows an index of 9 isolated ventricular depolarization region datapoints (shown as 902). Conduction skipping is shown as peaks (904) in the calculated conduction deviation distances having a value greater than a threshold (906) of 0.03 of QRSvector$_{max}$ and peak prominence of 0.015 of QRSvector$_{max}$. The number of conduction skipping (feature "numCondSkip") may be assessed as the number of conduction deviation distances exceeding this threshold within the isolated ventricular depolarization regions of the signal (e.g., FIG. 9A). The maximum value of the conduction skipping ("maxCondDist") can be assessed as the amplitude value of the maximum assessed peak, e.g., of the isolated ventricular depolarization regions of the signal (e.g., FIG. 9A).

Figure 9B:
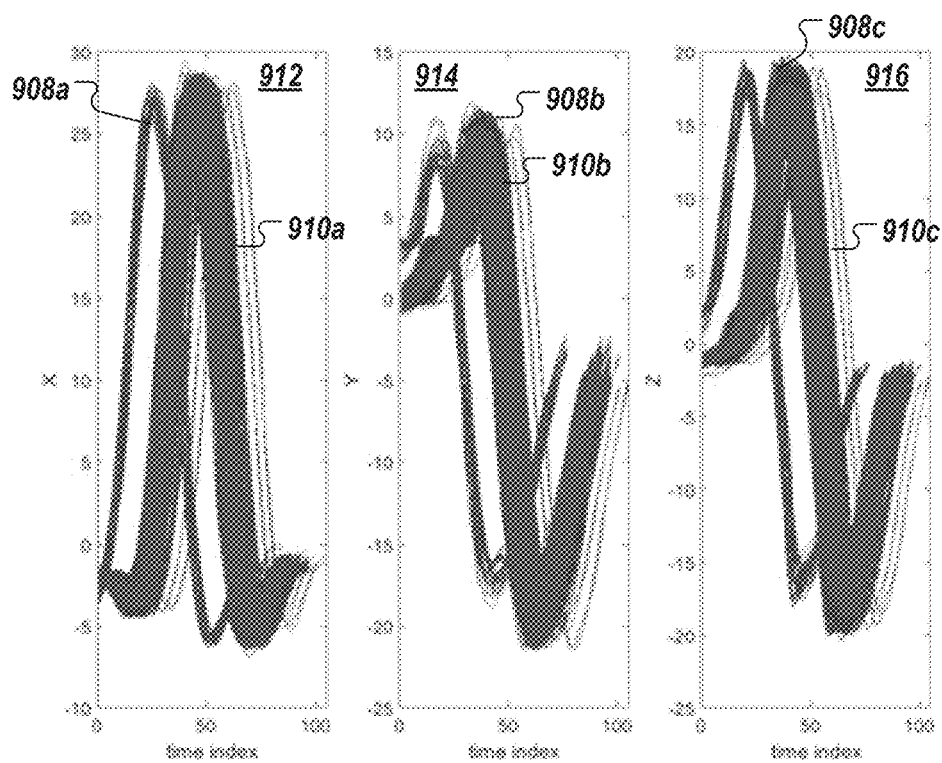
FIG. 9B shows isolated ventricular depolarization regions in accordance with an illustrative embodiment.
Figure 9C:
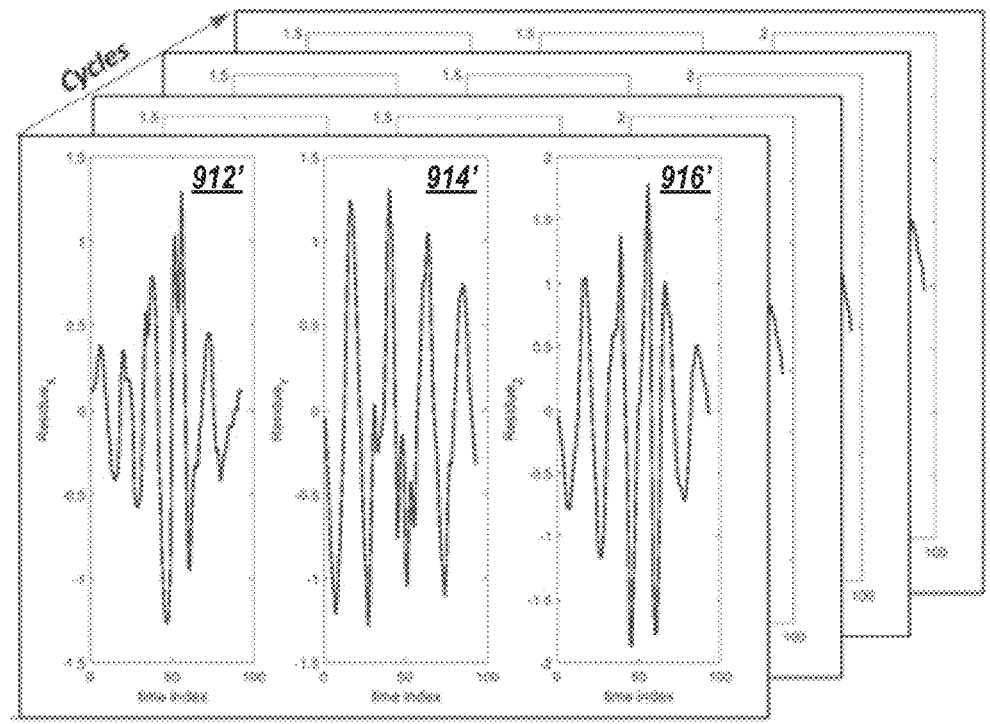
FIG. 9C shows calculated conduction deviations within isolated ventricular depolarization regions of each of the acquired channels of a signal that may be calculated for a number of cycles in accordance with an illustrative embodiment.

FIG. 9B shows isolated ventricular depolarization regions for three channels shown in windows 908a, 908b, 908c, respectively, in which each window includes a channel of an acquired cardiac biophysical signal and a corresponding model of that signals (shown as 910a, 910b, 910c) generated using the MDFD algorithm. FIG. 9C shows calculated conduction deviations in windows 912', 914', and 916' for each of the channels in windows 912, 914, 916. In each window 912', 914', 916', the conduction deviation is shown for one cycle, which is calculated across the multiple cycles of the signal and model data. In FIG. 9C, each window (912', 914', 916') shows the time index (in the x-axis) of the difference determined between the cardiac biophysical signal and the model signal. The conduction deviation can be determined for each cycle and for each of the channels and then aggregated to provide the distribution of conduction deviation shown in FIG. 9A.

Referring to FIGS. 8B and 8C, each shows an example method (820 and 840, respectively) to assess shapes of conduction deviation distance distribution as features 404 for a given isolated signal region. To identify the conduction deviation distance distribution, method 820 (FIG. 8B) may first perform the isolation (802) and residue point cloud operation (804) as described in relation to FIG. 8A. Methods 820 and 840 then perform an assessment of the shape of a generated Euclidean distance distribution.

Figure 9D:
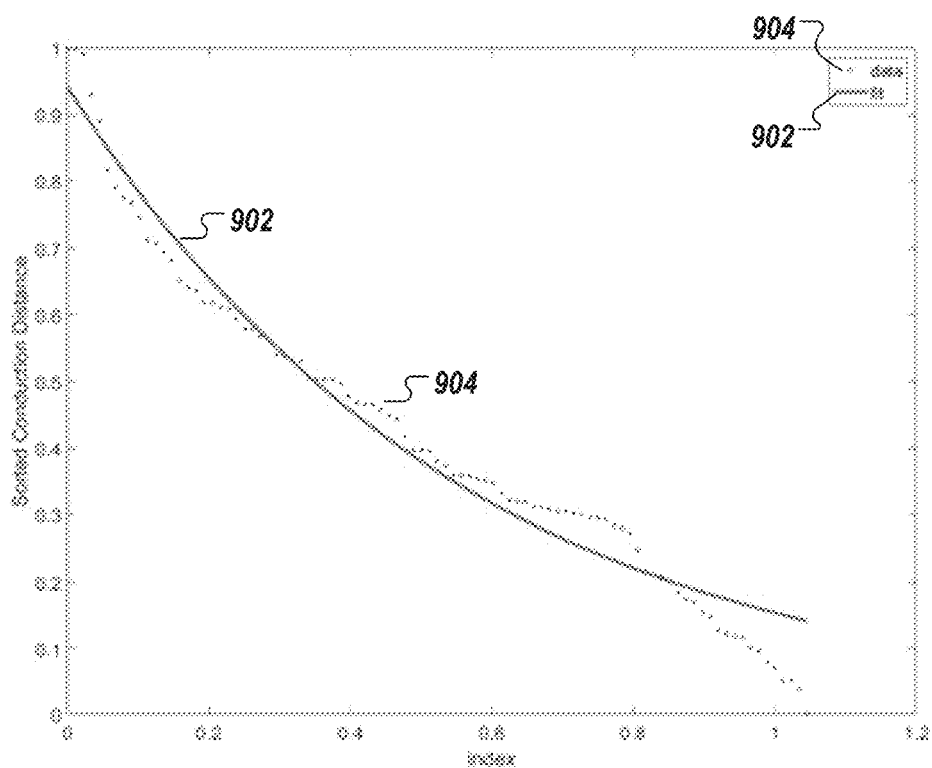
FIG. 9D shows an example fit applied to a sorted conduction deviation distance data set in accordance with an illustrative embodiment.

In FIG. 8B, following the determining of the Euclidean distances for each of the isolated regions (804), method 820 includes sorting (822) the distribution of Euclidean distances and then determining (824) a fit within the sorted distribution. For an example of an exponential fit (e.g., $y_{fit}=ce^{-\alpha t}$), the extracted feature parameter from the fit may be a decay rate ($\alpha$) (referred to as "decayRateCondDist" in Table 2) and/or a decay coefficient (c) (referred to as "decayCoefCondDist" in Table 2). FIG. 9D shows an example exponential fit applied to a sorted conduction deviation distance data set. Other types of fit may be employed, e.g., polynomial fit.

In FIG. 8C, following the determining of the Euclidean distances for each of the isolated regions (804), method 840 includes accumulating (842) the calculated conduction distance (e.g., per Equation 5) and producing an accumulated conduction distance distribution (also referred to herein as "accumulative conduction distance") among the number of cycles. In some embodiments, the accumulative conduction distance is determined by Equation 6.

$$\sum_{i=1}^{N} D_{i,M} \qquad \text{(Eq. 6)}$$

Method 840 then includes determining (842) a statistical assessment of the accumulative conduction distance distribution. Example of statistical assessment can include the median (e.g., "medianCondDelay_3D" in Table 2), mean, standard deviation (e.g., "stdCondDelay_3D", "stdCondDelay_X", "stdCondDelay_Y", and "stdCondDelay_Z"), relative size (e.g., "relCondDelay_X", "relCondDelay_Y", and "relCondDelay_Z").

In Table 2, the relative size of distribution can be determined as a ratio of the accumulative conduction skipping of a given channel over the total accumulative conduction distance. For the "stdCondDelay_3D" feature, the accumulative distribution can be generated from all of the assessed conduction distances for cycles of all of the channels. For the "stdCondDelay_X," "stdCondDelay_Y," and "stdCondDelay_Z," the accumulative distribution can be generated for all the assessed conduction distances for cycles in individual channels (referred to as "X," "Y," and "Z").

Ventricular Depolarization Conduction Deviation
Poincaré Features Example #2

FIG. 5 illustrates, as the second of two example feature or parameter categories, an example ventricular depolarization conduction deviation Poincaré feature computation module 700 configured to determine values of a Poincaré model derived from VD conduction deviation associated properties of one or more acquired biophysical signals in accordance with an illustrative embodiment. As shown in FIG. 5, the ventricular depolarization conduction deviation feature computation module 500 may output assessments of the Poincaré analysis of conduction deviation distance distribution 604, including geometric assessment of a shape (e.g., alpha hull or convex hull) enclosed around the Poincaré analysis.

The features can quantify the beat-to-beat variations of conduction deviations derived through Poincaré analysis, specifically to capture short-term dynamics. The Poincaré analysis may be applied to the maximum conduction delay across each of the three channels, as well as the three two-dimensional Poincaré analyses (e.g., all using a best-fit alpha shape). The analysis may be performed in 2D space or 3D space (e.g., via phase space)

Table 3-1 shows an example VD conduction deviation Poincaré features and their corresponding description to which one or more, or all, may be generated by the ventricular depolarization conduction deviation Poincaré feature computation module 700.

there appears to be only a single point in the plot because they are all identical. If there are variations in the state of the system, the Poincaré map would appear to have scattering points. As an example, the Poincaré maps can be used to assess the maximum conduction delay across each of the three channels.

Figure 10:
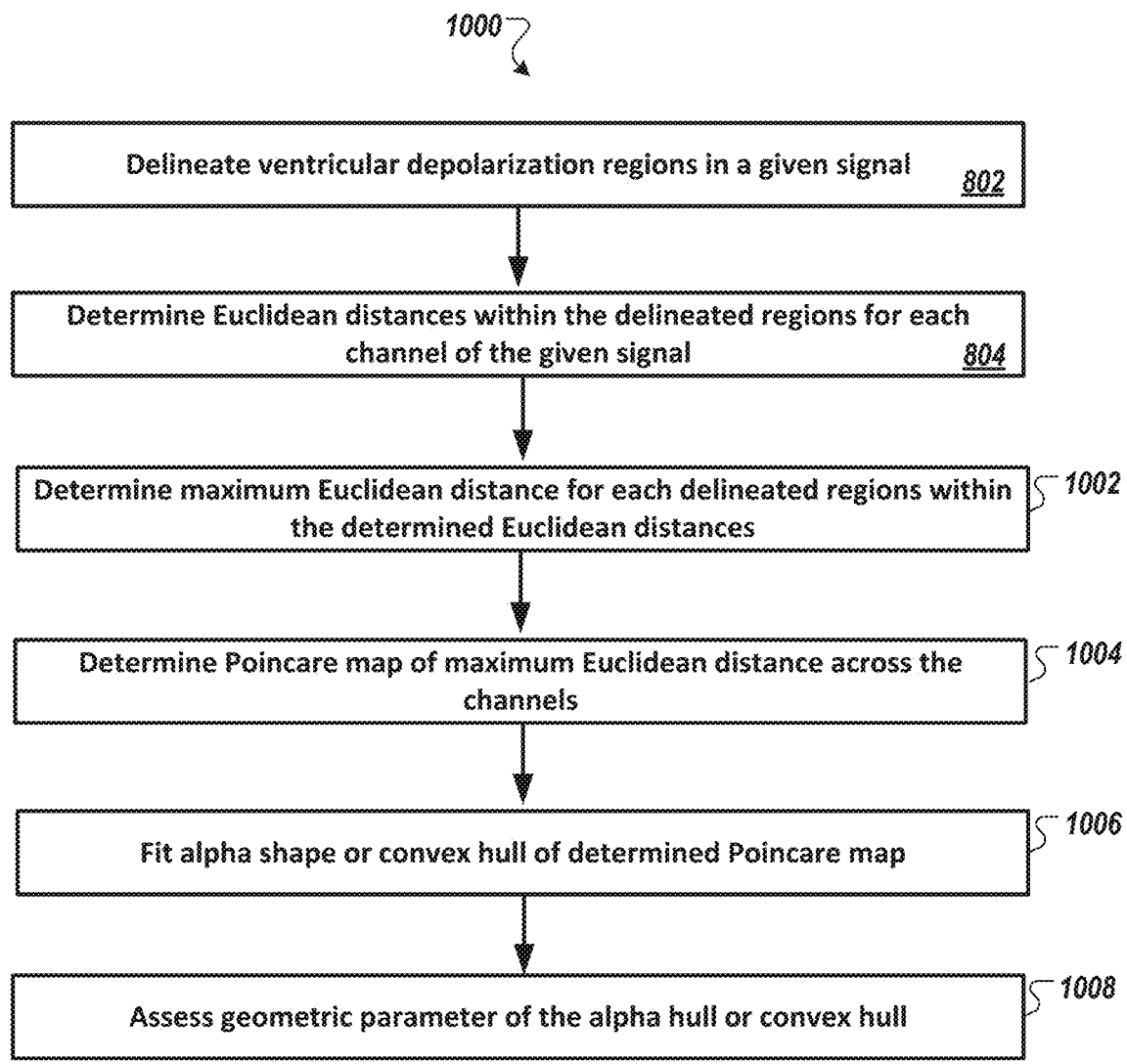
FIG. 10 is a diagram showing an example method of assessing Poincaré maps of ventricular depolarization conduction deviation used by the ventricular depolarization conduction deviation feature computation module of FIG. 7 in accordance with an illustrative embodiment.

In the example of FIG. 10, method 1000 may first perform the isolation (802) and residue point cloud operation (804) as described in relation to FIG. 8A.

Method 1000 then includes determining (1002) the set of maximum values of the Euclidean distance in which a maximum value of each delineated region is determined within the set of determined Euclidean distances.

Method 1000 then includes determining (1004) a Poincaré map of maximum Euclidean distance across the channels, e.g., between X and Y channels, X and Z channels, and Y and Z channels for a 3-channel cardiac signal having X, Y,

TABLE 3-1

| Feature Name | Feature Description |
|---|---|
| MaxCondDelay_XY Alpha | Poincaré of assessed maximum conduction delay of X within a given VD region and assessed maximum conduction delay of Y within the same VD region, and enclosed by an alpha shape, the parameter is the radius of the enclosed alpha shape. |
| MaxCondDelay_XY SurfaceArea | Poincaré of assessed maximum conduction delay of X within a given VD region and assessed maximum conduction delay of Y within the same VD region, and enclosed by an alpha shape, the parameter is the surface area of the enclosed alpha shape. |
| MaxCondDelay_XY Perim | Poincaré of assessed maximum conduction delay of X within a given VD region and assessed maximum conduction delay of Y within the same VD region, and enclosed by an alpha shape, the parameter is the perimeter of the enclosed alpha shape. |
| MaxCondDelay_XY PerimSurfaceAreaRatio | Poincaré of assessed maximum conduction delay of X within a given VD region and assessed maximum conduction delay of Y within the same VD region, and enclosed by an alpha shape, the parameter is ratio the perimeter to the surface area of the enclosed alpha shape. |
| MaxCondDelay_XY AlphaShapeDensity | Poincaré of assessed maximum conduction delay of X within a given VD region and assessed maximum conduction delay of Y within the same VD region, and enclosed by an alpha shape, the parameter is the density of the enclosed alpha shape (e.g., surface area normalized by the number of data points). |
| MaxCondDelay_XY ConvexSurfaceArea | Poincaré of assessed maximum conduction delay of X within a given VD region and assessed maximum conduction delay of Y within the same VD region, and enclosed by a convex hull shape, the parameter is the surface area of the enclosed convex hull. |
| MaxCondDelay_XY VoidArea | Poincaré of assessed maximum conduction delay of X within a given VD region and assessed maximum conduction delay of Y within the same VD region, and enclosed by an alpha shape and convex hull shape, the parameter is an assessed void, e.g., as a difference between the surface $Area_{ConvexHull}$ and the surface $Area_{AlphaShape}$. |
| MaxCondDelay_XY Porosity | Poincaré of assessed maximum conduction delay of X within a given VD region and assessed maximum conduction delay of Y within the same VD region, and enclosed by an alpha shape and convex hull shape, the parameter is an assessed porosity, e.g., as a ratio of the void area over the surface$Area_{ConvexHull}$. |

FIG. 10 is a diagram showing an example method 1000 of assessing Poincaré maps of ventricular depolarization conduction deviation used by the ventricular depolarization conduction deviation feature computation module 500 of FIG. 5 in accordance with an illustrative embodiment.

Poincaré-based analysis may be performed using Poincaré maps to quantify maximum conduction delay to examine the intersection of periodic changes of the state-space among different channels of an acquired signal (e.g., cardiac signal). The state-space variations can be represented in a two-dimensional plot or data space as a Poincaré map having coordinates of (state t, state t+1) for all available time t or data index n. If the system represented in a Poincaré map lacks any variation, then the state t=state t+1 for all t, and and Z channels. In some embodiments, the Poincaré map is determined from the phase space model with respect to two of three-axis.

Method 1000 then includes fitting (1006) an alpha shape or convex hull or other encapsulated shapes or geometries of the data within the Poincaré map. An alpha hull shape can be created as a bounding area that envelops a set of 2-D (or a volume for 3-D points). Operation 1006 may adjust the radius of the alpha hull or fitting operation to determine the best fit (e.g., to determine "MaxCondDelay_XY Alpha" in Table 2).

In some embodiments, method 1000 then includes assessing (1008) one or more geometric parameters of the alpha hull or convex hull. Examples of geometric parameters may include, but are not limited to, surface area, perimeter, density, void area, and porosity.

The density of the alpha shape or convex hull shape may be determined as a surface area normalized by the number of data points used to generate the shape.

The void area may be determined as a difference between a determined surface area of a convex hull and a determined surface area of an alpha hull, e.g., as shown in Equation 7.

$$\text{Void} = \text{surface\_area}_{convex\_hull} - \text{surface\_area}_{alpha\_hull} \quad \text{(Eq. 7)}$$

The porosity may be determined as a ratio of a determined void area over the determined surface area of the convex hull, e.g., as shown in Equation 8.

$$\text{Porosity} = \frac{\text{surface\_area}_{convex\_hull} - \text{surface\_area}_{alpha\_hull}}{\text{surface\_area}_{convex\_hull}} \quad \text{(Eq. 8)}$$

Figure 11:
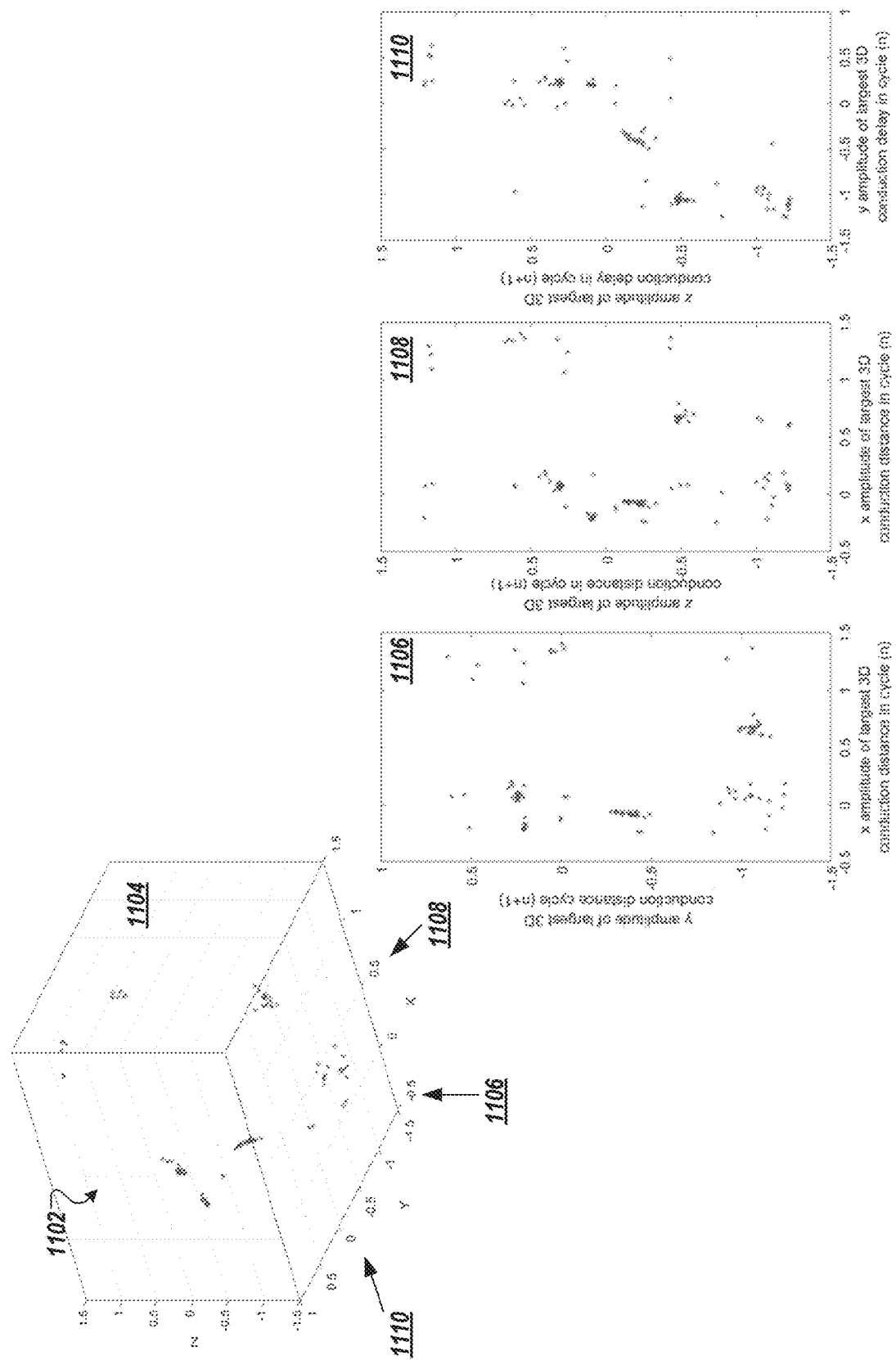
FIG. 11 shows Poincaré maps that may be used to analyze the dynamics of maximum conduction deviation amplitudes in accordance with an illustrative embodiment.

FIG. 11 shows a Poincaré map that may be used to analyze the dynamics of maximum conduction deviation amplitudes in accordance with an illustrative embodiment. In the example of FIG. 11, the maximum conduction deviation amplitudes 1102 are generated in phase space between XY, XZ, and YZ channels for the various isolated VD cycles therein and shown in Poincaré map 1104. FIG. 11 also shows three 2D projections of the Poincaré map 1104 in windows 1106, 1108, 1110. In window 1106, the 2D Poincaré map is shown for $X_n$ and $Y_{n+1}$ data points. In window 1108, the 2D Poincaré map is shown for $X_n$ and $Z_{n+1}$ data points. In window 1110, the 2D Poincaré map is shown for $Y_n$ and $Z_{n+1}$ data points.

Table 3-2 shows examples of VD conduction deviation Poincaré features that can be generated from the 2D or 3D Poincaré map. One or more, or all, of these features may be generated. In Table 3-2, at least one feature type (see "*" in Table 3-2) has been observed to have significant utility in the assessment of the presence or non-presence of at least one cardiac disease or condition—specifically, the determination of presence or non-presence of elevated LVEDP. The list of the specific features determined to have significant utility in the assessment of the presence or non-presence of abnormal or elevated LVEDP is provided in Table 5.

TABLE 3-2

| | |
|---|---|
| MaxCondDelay_XZ Alpha | Poincaré of assessed maximum conduction delay of X within a given VD region and assessed maximum conduction delay of Z within the same VD region, and enclosed by an alpha shape, the parameter is the radius of the enclosed alpha shape. |
| MaxCondDelay_XZ SurfaceArea | Poincaré of assessed maximum conduction delay of X within a given VD region and assessed maximum conduction delay of Z within the same VD region, and enclosed by an alpha shape, the parameter is the surface area of the enclosed alpha shape. |
| MaxCondDelay_XZ Perim | Poincaré of assessed maximum conduction delay of X within a given VD region and assessed maximum conduction delay of Z within the same VD region, and enclosed by an alpha shape, the parameter is the perimeter of the enclosed alpha shape. |
| MaxCondDelay_XZ PerimSurfaceAreaRatio* | Poincaré of assessed maximum conduction delay of X within a given VD region and assessed maximum conduction delay of Z within the same VD region, and enclosed by an alpha shape, the parameter is the ratio of the perimeter to the surface area of the enclosed alpha shape. |
| MaxCondDelay_XZ AlphaShapeDensity | Poincaré of assessed maximum conduction delay of X within a given VD region and assessed maximum conduction delay of Z within the same VD region and enclosed by an alpha shape, the parameter is the density of the enclosed alpha shape (e.g., surface area normalized by the number of data points). |
| MaxCondDelay_XZ ConvexSurfaceArea | Poincaré of assessed maximum conduction delay of X within a given VD region and assessed maximum conduction delay of Z within the same VD region, and enclosed by a convex hull shape, the parameter is the surface area of the enclosed convex hull. |
| MaxCondDelay_XZ VoidArea | Poincaré of assessed maximum conduction delay of X within a given VD region and assessed maximum conduction delay of Z within the same VD region, and enclosed by an alpha shape and convex hull shape, the parameter is an assessed void, e.g., as a difference between the surface $\text{Area}_{ConvexHull}$ and the surface $\text{Area}_{AlphaShape}$. |
| MaxCondDelay_XZ Porosity | Poincaré of assessed maximum conduction delay of X within a given VD region and assessed maximum conduction delay of Z within the same VD region, and enclosed by an alpha shape and convex hull shape, the parameter is an assessed porosity, e.g., as a ratio of the void area over the $\text{surfaceArea}_{ConvexHull}$. |
| MaxCondDelay_YZ Alpha | Poincaré of assessed maximum conduction delay of Y within a given VD region and assessed maximum conduction delay of Z within the same VD region and enclosed by an alpha shape, the parameter is the radius of the enclosed alpha shape. |
| MaxCondDelay_YZ SurfaceArea | Poincaré of assessed maximum conduction delay of Y within a given VD region and assessed maximum conduction delay of Z within the same VD region, and enclosed by an alpha shape, the parameter is the surface area of the enclosed alpha shape. |
| MaxCondDelay_YZ Perim | Poincaré of assessed maximum conduction delay of Y within a given VD region and assessed maximum conduction delay of Z within the same VD region, and enclosed by an alpha shape, the parameter is the perimeter of the enclosed alpha shape. |

TABLE 3-2-continued

| | |
|---|---|
| MaxCondDelay_YZ PerimSurfaceAreaRatio | Poincaré of assessed maximum conduction delay of Y within a given VD region and assessed maximum conduction delay of Z within the same VD region, and enclosed by an alpha shape, the parameter is the ratio of the perimeter to the surface area of the enclosed alpha shape. |
| MaxCondDelay_YZ AlphaShapeDensity | Poincaré of assessed maximum conduction delay of Y within a given VD region and assessed maximum conduction delay of Z within the same VD region and enclosed by an alpha shape, the parameter is the density of the enclosed alpha shape (e.g., surface area normalized by the number of data points). |
| MaxCondDelay_YZ ConvexSurfaceArea | Poincaré of assessed maximum conduction delay of Y within a given VD region and assessed maximum conduction delay of Z within the same VD region, and enclosed by a convex hull shape, the parameter is the surface area of the enclosed convex hull. |
| MaxCondDelay_YZ VoidArea | Poincaré of assessed maximum conduction delay of Y within a given VD region and assessed maximum conduction delay of Z within the same VD region, and enclosed by an alpha shape and convex hull shape, the parameter is an assessed void, e.g., as a difference between the surface $\text{Area}_{ConvexHull}$ and the surface $\text{Area}_{AlphaShape}$. |
| MaxCondDelay_YZ Porosity | Poincaré of assessed maximum conduction delay of Y within a given VD region and assessed maximum conduction delay of Z within the same VD region, and enclosed by an alpha shape and convex hull shape, the parameter is an assessed porosity, e.g., as a ratio of the void area over the $\text{surfaceArea}_{ConvexHull}$. |

In some embodiments, the Poincaré analysis may be assessed based on a lag between two channels under evaluation, e.g., between x and x−2 along each axis, instead of between x and x−1.

Table 3-3 shows examples of VD conduction deviation Poincaré features that can be created between lagged signals. One or more, or all, of these features may be generated. In Table 3-3, at least one feature type (see "*" in Table 3-3) has been observed to have significant utility in the assessment of the presence or non-presence of at least one cardiac disease or condition—specifically, the determination of presence or non-presence of elevated LVEDP. The list of the specific features determined to have significant utility in the assessment of the presence or non-presence of abnormal or elevated LVEDP is provided in Table 5

TABLE 3-3

| Feature Name | Feature Description |
|---|---|
| MaxCondDelay_XYLag_PoincaréAlpha* | Lagged Poincaré of assessed maximum conduction delay of X within a given VD region and assessed maximum conduction delay of Y within the same VD region, and enclosed by an alpha shape, the parameter is the radius of the enclosed alpha shape. |
| MaxCondDelay_XYLag_PoincaréSurfaceArea | Lagged Poincaré of assessed maximum conduction delay of X within a given VD region and assessed maximum conduction delay of Y within the same VD region, and enclosed by an alpha shape, the parameter is the surface area of the enclosed alpha shape. |
| MaxCondDelay_XYLag_PoincaréPerim | Lagged Poincaré of assessed maximum conduction delay of X within a given VD region and assessed maximum conduction delay of Y within the same VD region, and enclosed by an alpha shape, the parameter is the perimeter of the enclosed alpha shape. |
| MaxCondDelay_XYLag_PoincaréPerimSurfaceAreaRatio* | Lagged Poincaré of assessed maximum conduction delay of X within a given VD region and assessed maximum conduction delay of Y within the same VD region, and enclosed by an alpha shape, the parameter is the ratio of the perimeter to the surface area of the enclosed alpha shape. |
| MaxCondDelay_XYLag_PoincaréAlphaShapeDensity | Lagged Poincaré of assessed maximum conduction delay of X within a given VD region and assessed maximum conduction delay of Y within the same VD region, and enclosed by an alpha shape, the parameter is the density of the enclosed alpha shape (e.g., surface area normalized by the number of data points). |
| MaxCondDelay_XYLag_PoincaréConvexSurfaceArea | Lagged Poincaré of assessed maximum conduction delay of X within a given VD region and assessed maximum conduction delay of Y within the same VD region, and enclosed by a convex hull shape, the parameter is the surface area of the enclosed convex hull. |
| MaxCondDelay_XYLag_PoincaréVoidArea | Lagged Poincaré of assessed maximum conduction delay of X within a given VD region and assessed maximum conduction delay of Y within the same VD region, and enclosed by an alpha shape and convex hull shape, parameter is an assessed void, e.g., as a difference |

TABLE 3-3-continued

| Feature Name | Feature Description |
| --- | --- |
| | between the surface Area$_{ConvexHull}$ and the surface Area$_{AlphaShape}$. |
| MaxCondDelay_XYLag_PoincaréPorosity | Lagged Poincaré of assessed maximum conduction delay of X within a given VD region and assessed maximum conduction delay of Y within the same VD region, and enclosed by an alpha shape and convex hull shape, the parameter is an assessed porosity, e.g., as a ratio of the void area over the surfaceArea$_{ConvexHull}$. |
| MaxCondDelay_XZLag_PoincaréAlpha* | Lagged Poincaré of assessed maximum conduction delay of X within a given VD region and assessed maximum conduction delay of Z within the same VD region, and enclosed by an alpha shape, the parameter is the radius of the enclosed alpha shape. |
| MaxCondDelay_XZLag_PoincaréSurfaceArea | Lagged Poincaré of assessed maximum conduction delay of X within a given VD region and assessed maximum conduction delay of Z within the same VD region, and enclosed by an alpha shape, the parameter is the surface area of the enclosed alpha shape. |
| MaxCondDelay_XZLag_PoincaréPerim | Lagged Poincaré of assessed maximum conduction delay of X within a given VD region and assessed maximum conduction delay of Z within the same VD region, and enclosed by an alpha shape, the parameter is the perimeter of the enclosed alpha shape. |
| MaxCondDelay_XZLag_PoincaréPerimSurfaceAreaRatio | Lagged Poincaré of assessed maximum conduction delay of X within a given VD region and assessed maximum conduction delay of Z within the same VD region, and enclosed by an alpha shape, the parameter is the ratio of the perimeter to the surface area of the enclosed alpha shape. |
| MaxCondDelay_XZLag_PoincaréAlphaShapeDensity | Lagged Poincaré of assessed maximum conduction delay of X within a given VD region and assessed maximum conduction delay of Z within the same VD region, and enclosed by an alpha shape, the parameter is the density of the enclosed alpha shape (e.g., surface area normalized by the number of data points). |
| MaxCondDelay_XZLag_PoincaréConvexSurfaceArea | Lagged Poincaré of assessed maximum conduction delay of X within a given VD region and assessed maximum conduction delay of Z within the same VD region, and enclosed by a convex hull shape, the parameter is the surface area of the enclosed convex hull. |
| MaxCondDelay_XZLag_PoincaréVoidArea | Lagged Poincaré of assessed maximum conduction delay of X within a given VD region and assessed maximum conduction delay of Z within the same VD region, and enclosed by an alpha shape and convex hull shape, the parameter is an assessed void, e.g., as a difference between the surface Area$_{ConvexHull}$ and the surface Area$_{AlphaShape}$. |
| MaxCondDelay_XZLag_PoincaréPorosity | Lagged Poincaré of assessed maximum conduction delay of X within a given VD region and assessed maximum conduction delay of Z within the same VD region, and enclosed by an alpha shape and convex hull shape, the parameter is an assessed porosity, e.g., as a ratio of the void area over the surfaceArea$_{ConvexHull}$. |
| MaxCondDelay_YZLag_PoincaréAlpha | Lagged Poincaré of assessed maximum conduction delay of Y within a given VD region and assessed maximum conduction delay of Z within the same VD region, and enclosed by an alpha shape, the parameter is the radius of the enclosed alpha shape. |
| MaxCondDelay_YZLag_PoincaréSurfaceArea | Lagged Poincaré of assessed maximum conduction delay of Y within a given VD region and assessed maximum conduction delay of Z within the same VD region, and enclosed by an alpha shape, the parameter is the surface area of the enclosed alpha shape. |
| MaxCondDelay_YZLag_PoincaréPerim | Lagged Poincaré of assessed maximum conduction delay of Y within a given VD region and assessed maximum conduction delay of Z within the same VD region, and enclosed by an alpha shape, the parameter is the perimeter of the enclosed alpha shape. |
| MaxCondDelay_YZLag_PoincaréPerimSurfaceAreaRatio | Lagged Poincaré of assessed maximum conduction delay of Y within a given VD region and assessed maximum conduction delay of Z within the same VD region, and enclosed by an alpha shape, the parameter is the ratio of the perimeter to the surface area of the enclosed alpha shape. |
| MaxCondDelay_YZLag_PoincaréAlphaShapeDensity | Lagged Poincaré of assessed maximum conduction delay of Y within a given VD region and assessed maximum conduction delay of Z within the same VD region, and enclosed by an alpha shape, the parameter is the density |

TABLE 3-3-continued

| Feature Name | Feature Description |
|---|---|
| | of the enclosed alpha shape (e.g., surface area normalized by the number of data points). |
| MaxCondDelay_YZLag_PoincaréConvexSurfaceArea | Lagged Poincaré of assessed maximum conduction delay of Y within a given VD region and assessed maximum conduction delay of Z within the same VD region, and enclosed by a convex hull shape, the parameter is the surface area of the enclosed convex hull. |
| MaxCondDelay_YZLag_PoincaréVoidArea | Lagged Poincaré of assessed maximum conduction delay of Y within a given VD region and assessed maximum conduction delay of Z within the same VD region, and enclosed by an alpha shape and convex hull shape, the parameter is an assessed void, e.g., as a difference between the surface $Area_{ConvexHull}$ and the surface $Area_{AlphaShape}$. |
| MaxCondDelay_YZLag_PoincaréPorosity | Lagged Poincaré of assessed maximum conduction delay of Y within a given VD region and assessed maximum conduction delay of Z within the same VD region, and enclosed by an alpha shape and convex hull shape, the parameter is an assessed porosity, e.g., as a ratio of the void area over the surface$Area_{ConvexHull}$. |

Experimental Results and Examples

Several development studies have been conducted to develop feature sets, and in turn, algorithms that can be used to estimate the presence or non-presence, severity, or localization of diseases, medical conditions, or an indication of either. In one study, algorithms were developed for the non-invasive assessment of abnormal or elevated LVEDP. As noted above, abnormal or elevated LVEDP is an indicator of heart failure in its various forms. In another development study, algorithms and features were developed for the non-invasive assessment of coronary artery disease.

As part of these two development studies, clinical data were collected from adult human patients using a biophysical signal capture system and according to protocols described in relation to FIG. 2. The subjects underwent cardiac catheterization (the current "gold standard" tests for CAD and abnormal LVEDP evaluation) following the signal acquisition, and the catheterization results were evaluated for CAD labels and elevated LVEDP values. The collected data were stratified into separate cohorts: one for feature/algorithm development and the other for their validation.

Within the feature development phases, features were developed, including the conduction deviation features, to extract characteristics in an analytical framework from biopotential signals (as an example of the cardiac signals discussed herein) and photo-absorption signals (as examples of the hemodynamic or photoplethysmographic discussed herein) that are intended to represent properties of the cardiovascular system. Corresponding classifiers were also developed using classifier models, linear models (e.g., Elastic Net), decision tree models (XGB Classifier, random forest models, etc.), support vector machine models, and neural network models to non-invasively estimate the presence of an elevated or abnormal LVEDP. Univariate feature selection assessments and cross-validation operations were performed to identify features for use in machine learning models (e.g., classifiers) for the specific disease indication of interest. Further description of the machine learning training and assessment are described in U.S. Provisional Patent Application No. 63/235,960, filed Aug. 23, 2021, entitled "Method and System to Non-Invasively Assess Elevated Left Ventricular End-Diastolic Pressure," which is hereby incorporated by reference herein in its entirety.

The univariate feature selection assessments evaluated many scenarios, each defined by a negative and a positive dataset pair using a t-test, mutual information, and AUC-ROC evaluation. The t-test is a statistical test that can determine if there is a difference between two sample means from two populations with unknown variances. Here, the t-tests were conducted against a null hypothesis that there is no difference between the means of the feature in these groups, e.g., normal LVEDP vs. elevated (for LVEDP algorithm development); CAD-vs. CAD+ (for CAD algorithm development). A small p-value (e.g., ≤0.05) indicates strong evidence against the null hypothesis.

Mutual information (MI) operations were conducted to assess the dependence of elevated or abnormal LVEDP or significant coronary artery disease on certain features. An MI score greater than one indicates a higher dependency between the variables being evaluated. MI scores less than one indicates a lower dependency of such variables, and an MI score of zero indicates no such dependency.

A receiver operating characteristic curve, or ROC curve, illustrates the diagnostic ability of a binary classifier system as its discrimination threshold is varied. The ROC curve may be created by plotting the true positive rate (TPR) against the false positive rate (FPR) at various threshold settings. AUC-ROC quantifies the area under a receiver operating characteristic (ROC) curve—the larger this area, the more diagnostically useful the model is. The ROC, and AUC-ROC, value is considered statistically significant when the bottom end of the 95% confidence interval is greater than 0.50.

Table 4 shows an example list of the negative and a positive dataset pair used in the univariate feature selection assessments. Specifically, Table 4 shows positive datasets being defined as having an LVEDP measurement greater than 20 mmHg or 25 mmHg, and negative datasets were defined as having an LVEDP measurement less than 12 mmHg or belonging to a subject group determined to have normal LVEDP readings.

TABLE 4

| Negative Dataset | Positive Dataset |
|---|---|
| ≤12 (mmHg) | ≥20 (mmHg) |
| ≤12 (mmHg) | ≥25 (mmHg) |

TABLE 4-continued

| Negative Dataset | Positive Dataset |
|---|---|
| Normal LVEDP | ≥20 (mmHg) |
| Normal LVEDP | ≥25 (mmHg) |

Table 5 shows a list of conduction deviation features having been determined to have utility in estimating the presence and non-presence of elevated LVEDP in an algorithm executing in a clinical evaluation system. The features of Table 5 and corresponding classifiers have been validated to have clinical performance comparable to the gold standard invasive method to measure elevated LVEDP.

TABLE 5

| Feature_name | t-test | AUC | MI |
|---|---|---|---|
| relCondDelay_Z | 0.0447 | n/s | n/s |
| MaxCondDelay_XZLag_PoincaréAlpha | 0.0349 | n/s | n/s |
| MaxCondDelay_YZLag_PoincaréPerimSurfaceAreaRatio | 0.0330 | n/s | n/s |
| MaxCondDelay_YZPerimSurfaceAreaRatio | 0.0273 | n/s | n/s |

FA Scenario = LVEDP <= 12 (N = 246) vs >= 20 (N = 209)

Table 6 shows a list of conduction deviation features having been determined to have utility in estimating the presence and non-presence of significant CAD in an algorithm executing in a clinical evaluation system. The features of Table 6 and corresponding classifiers have been validated to have clinical performance comparable to the gold standard invasive method to measure CAD.

TABLE 6

| Feature_name | t-test | AUC | MI |
|---|---|---|---|
| MaxCondDist | n/s | 0.5010 | n/s |
| stdCondDelay_Z | n/s | n/s | 1.0025 |
| relCondDelay_X | n/s | n/s | 1.0220 |
| decayRateCondDist | n/s | n/s | 1.0356 |
| stdCondDelay_X | 0.0365 | n/s | n/s |

FA scenario = significant CAD (e.g., defined as >70% blockage and/or FFR < 0.8) (N = 464; 232 CAD positives and 232 CAD negatives (½ single and ½ multi-vessel disease) (½ are males and ½ are females)

The determination that certain conduction deviation features have clinical utility in estimating the presence and non-presence of elevated LVEDP or the presence and non-presence of significant CAD provides a basis for the use of these conduction deviation features or parameters, as well as other features described herein, in estimating for the presence or non-presence and/or severity and/or localization of other diseases, medical condition, or an indication of either particularly, though not limited to, heart disease or conditions described herein.

The experimental results further indicate that intermediary data or parameters of conduction deviation features also have clinical utility in diagnostics as well as treatment, controls, monitoring, and tracking applications.

Example Clinical Evaluation System

FIG. 12A shows an example clinical evaluation system 1200 (also referred to as a clinical and diagnostic system 1200 that implements the modules of FIG. 1 to non-invasively compute conduction deviation features or parameters, along with other features or parameters, to generate, via a classifier (e.g., machine-learned classifier), one or more metrics associated with the physiological state of a patient or subject according to an embodiment. Indeed, the feature modules (e.g., of FIGS. 1, 4-5) can be generally viewed as a part of a system (e.g., the clinical evaluation system 1200) in which any number and/or types of features may be utilized for a disease state, medical condition, an indication of either, or combination thereof that is of interest, e.g., with different embodiments having different configurations of feature modules. This is additionally illustrated in FIG. 12A, where the clinical evaluation system 1200 is of a modular design in which disease-specific add-on modules 1202 (e.g., to assess for elevated LVEDP or mPAP, CAD, PH/PAH, abnormal LVEF, HFpEF, and others described herein) are capable of being integrated alone or in multiple instances with a singular platform (i.e., a base system 1204) to realize system 1200's full operation. The modularity allows the clinical evaluation system 1200 to be designed to leverage the same synchronously acquired biophysical signals and data set and base platform to assess for the presence of several different diseases as such disease-specific algorithms are developed, thereby reducing testing and certification time and cost.

In various embodiments, different versions of the clinical evaluation system 1200 may implement the assessment system 103 (FIG. 1) by having included containing different feature computation modules that can be configured for a given disease state(s), medical condition(s), or indicating condition(s) of interest. In another embodiment, the clinical evaluation system 1200 may include more than one assessment system 103 and may be selectively utilized to generate different scores specific to a classifier 116 of that engine 103. In this way, the modules of FIGS. 1 and 12 in a more general sense may be viewed as one configuration of a modular system in which different and/or multiple engines 103, with different and/or multiple corresponding classifiers 116, may be used depending on the configuration of module desired. As such, any number of embodiments of the modules of FIG. 1, with or without conduction deviation specific feature(s), may exist.

In FIG. 12A, System 1200 can analyze one or more biophysical-signal data sets (e.g., 110) using machine-learned disease-specific algorithms to assess for the likelihood of elevated LVEDP, as one example, of pathology or abnormal state. System 1200 includes hardware and software components that are designed to work together in combination to facilitate the analysis and presentation of an estimation score using the algorithm to allow a physician to use that score, e.g., to assess for the presence or non-presence of a disease state, medical condition, or an indication of either.

The base system 1204 can provide a foundation of functions and instructions upon which each add-on module 1202 (which includes the disease-specific algorithm) then interfaces to assess for the pathology or indicating condition. The base system 1204, as shown in the example of FIG. 12A, includes a base analytical engine or analyzer 1206, a web-service data transfer API 1208 (shown as "DTAPI" 1208), a report database 1210, a web portal service module 1213, and the data repository 111 (shown as 112*a*).

Data repository 112*a*, which can be cloud-based, stores data from the signal capture system 102 (shown as 102*b*). Biophysical signal capture system 102*b*, in some embodiments, is a reusable device designed as a single unit with a seven-channel lead set and photoplethysmogram (PPG) sensor securely attached (i.e., not removable). Signal capture system 102*b*, together with its hardware, firmware, and software, provides a user interface to collect patient-specific metadata entered therein (e.g., name, gender, date of birth, medical record number, height, and weight, etc.) to synchronously acquire the patient's electrical and hemodynamic signals. The signal capture system 102*b* may securely transmit the metadata and signal data as a single data package directly to the cloud-based data repository. The data repository 112*a*, in some embodiments, is a secure cloud-based database configured to accept and store the patient-specific data package and allow for its retrieval by the analytical engines or analyzer 1206 or 1214.

Base analytical engine or analyzer 1206 is a secure cloud-based processing tool that may perform quality assessments of the acquired signals (performed via "SQA" module 1216), the results of which can be communicated to the user at the point of care. The base analytical engine or analyzer 1206 may also perform pre-processing (shown via pre-processing module 1218) of the acquired biophysical signals (e.g., 110—see FIG. 1). Web portal 1213 is a secure web-based portal designed to provide healthcare providers access to their patient's reports. An example output of the web portal 1213 is shown by visualization 1236. The report databases (RD) 1212 is a secure database and may securely interface and communicate with other systems, such as a hospital or physician-hosted, remotely hosted, or remote electronic health records systems (e.g., Epic, Cerner, Allscrips, CureMD, Kareo, etc.) so that output score(s) (e.g., 118) and related information may be integrated into and saved with the patient's general health record. In some embodiments, web portal 1213 is accessed by a call center to provide the output clinical information over a telephone. Database 1212 may be accessed by other systems that can generate a report to be delivered via the mail, courier service, personal delivery, etc.

Add-on modules 1202 includes a second part 1214 (also referred to herein as the analytical engine (AE) or analyzer 1214 and shown as "AE add-on module" 1214) that operates with the base analytical engine (AE) or analyzer 1206. Analytical engine (AE) or analyzer 1214 can include the main function loop of a given disease-specific algorithm, e.g., the feature computation module 1220, the classifier model 1224 (shown as "Ensemble" module 1224), and the outlier assessment and rejection module 1224 (shown as "Outlier Detection" module 1224). In certain modular configurations, the analytical engines or analyzers (e.g., 1206 and 1214) may be implemented in a single analytical engine module.

The main function loop can include instructions to (i) validate the executing environment to ensure all required environment variables values are present and (ii) execute an analysis pipeline that analyzes a new signal capture data file comprising the acquired biophysical signals to calculate the patient's score using the disease-specific algorithm. To execute the analysis pipeline, AE add-on module 1214 can include and execute instructions for the various feature modules 114 and classifier module 116 as described in relation to FIG. 1 to determine an output score (e.g., 118) of the metrics associated with the physiological state of a patient. The analysis pipeline in the AE add-on module 1214 can compute the features or parameters (shown as "Feature Computation" 1220) and identifies whether the computed features are outliers (shown as "Outlier Detection" 1222) by providing an outlier detection return for a signal-level response of outlier vs. non-outlier based on the feature. The outliers may be assessed with respect to the training data set used to establish the classifier (of module 116). AE add-on module 1214 may generate the patient's output score (e.g., 118) (e.g., via classifier module 1224) using the computed values of the features and classifier models. In the example of an evaluation algorithm for the estimation of elevated LVEDP, the output score (e.g., 118) is an LVEDP score. For the estimation of CAD, the output score (e.g., 118) is a CAD score.

The clinical evaluation system 1200 can manage the data within and across components using the web-service DTAPIs 1208 (also may be referred to as HCPP web services in some embodiments). DTAPIs 1208 may be used to retrieve acquired biophysical data sets from and to store signal quality analysis results to the data repository 112*a*. DTAPIs 1208 may also be invoked to retrieve and provide the stored biophysical data files to the analytical engines or analyzers (e.g., 1206, 1214), and the results of the analytical engine's analysis of the patient signals may be transferred using DTAPI 1208 to the report database 1210. DTAPIs 1208 may also be used, upon a request by a healthcare professional, to retrieve a given patient data set to the web portal module 1213, which may present a report to the healthcare practitioner for review and interpretation in a secure web-accessible interface.

Clinical evaluation system 1200 includes one or more feature libraries 1226 that store the conduction deviation features 120 and various other features of the feature modules 122. The feature libraries 1226 may be a part of the add-on modules 1202 or the base system 1204 and are accessed, in some embodiments, by the AE add-on module 1214.

Further details of the modularity of modules and various configurations are provided in U.S. Provisional Patent Application No. 63/235,960, filed Aug. 19, 2021, entitled "Modular Disease Assessment System," which is hereby incorporated by reference herein in its entirety.

Example Operation of the Modular Clinical Evaluation System

FIG. 12B shows a schematic diagram of the operation and workflow of the analytical engines or analyzers (e.g., 1206 and 1214) of the clinical evaluation system 1200 of FIG. 12A in accordance with an illustrative embodiment.

Signal quality assessment/rejection (1230). Referring to FIG. 12B, the base analytical engine or analyzer 1206 assesses (1230), via SQA module 1216, the quality of the acquired biophysical-signal data set while the analysis pipeline is executing. The results of the assessment (e.g., pass/fail) are immediately returned to the signal capture system's user interface for reading by the user. Acquired signal data that meet the signal quality requirements are deemed acceptable (i.e., "pass") and further processed and subjected to analysis for the presence of metrics associated with the pathology or indicating condition (e.g., elevated LVEDP or mPAP, CAD, PH/PAH, abnormal LVEF, HFpEF) by the AE add-on module 1214. Acquired signals deemed unacceptable are rejected (e.g., "fail"), and a notification is immediately sent to the user to inform the user to immediately obtain additional signals from the patient (see FIG. 2).

The base analytical engine or analyzer 1206 performs two sets of assessments for signal quality, one for the electrical signals and one for the hemodynamic signals. The electrical signal assessment (1230) confirms that the electrical signals are of sufficient length, that there is a lack of high-frequency noise (e.g., above 170 Hz), and that there is no power line noise from the environment. The hemodynamic signal assessment (1230) confirms that the percentage of outliers in the hemodynamic data set is below a pre-defined threshold and that the percentage and maximum duration that the signals of the hemodynamic data set are railed or saturated is below a pre-defined threshold.

Feature Value Computation (1232). The AE add-on module 1214 performs feature extraction and computation to calculate feature output values. In the example of the LVEDP algorithm, the AE add-on module 1214 determines, in some embodiments, a total of 446 feature outputs belonging to 18 different feature families (e.g., generated in modules 120 and 122), including the conduction deviation features (e.g., generated in module 120). For the CAD algorithm, an example implementation of the AE add-on module 1214 determines a set of features, including 456 features corresponding to the same 18 feature families.

Additional descriptions of the various features, including those used in the LVEDP algorithm and other features and their feature families, are described in U.S. Provisional Patent Application No. 63/235,960, filed Aug. 23, 2021, entitled "Method and System to Non-Invasively Assess Elevated Left Ventricular End-Diastolic Pressure"; U.S. Provisional Patent Application No. 63/236,072, filed Aug. 23, 2021, entitled "Methods and Systems for Engineering Visual Features From Biophysical Signals for Use in Characterizing Physiological Systems"; U.S. Provisional Patent Application No. 63/235,963, filed Aug. 23, 2021, entitled "Methods and Systems for Engineering Power Spectral Features From Biophysical Signals for Use in Characterizing Physiological Systems"; U.S. Provisional Patent Application No. 63/235,966, filed Aug. 23, 2021, entitled "Method and System for Engineering Rate-Related Features_From Biophysical Signals for Use in Characterizing Physiological Systems"; U.S. Provisional Patent Application No. 63/235,968, filed Aug. 23, 2021, entitled "Methods and Systems for Engineering Wavelet-Based Features From Biophysical Signals for Use in Characterizing Physiological Systems"; U.S. Provisional Patent Application No. 63/130,324, titled "Method and System to Assess Disease Using Cycle Variability Analysis of Cardiac and Photoplethysmographic Signals"; U.S. Provisional Patent Application No. 63/235,971, filed Aug. 23, 2021, entitled "Methods and Systems for Engineering photoplethysmographic Waveform Features for Use in Characterizing Physiological Systems"; U.S. Provisional Patent Application No. 63/236,193, filed Aug. 23, 2021, entitled "Methods and Systems for Engineering Cardiac Waveform Features From Biophysical Signals for Use in Characterizing Physiological Systems," each of which is hereby incorporated by reference herein in its entirety.

Classifier Output Computation (1234). The AE add-on module 1214 then uses the calculated feature outputs in classifier models (e.g., machine-learned classifier models) to generate a set of model scores. The AE add-on module 1214 joins the set of model scores in an ensemble of the constituent models, which, in some embodiments, averages the output of the classifier models as shown in Equation 9 in the example of the LVEDP algorithm.

$$\text{Ensemble estimation} = \frac{\text{Model}_1 + \text{Model}_2 + \dots + \text{Model}_n}{n} \quad \text{(Eq. 9)}$$

In some embodiments, classifier models may include models that are developed based on ML techniques described in U.S. Patent Publication No. 20190026430, entitled "Discovering Novel Features to Use in Machine Learning Techniques, such as Machine Learning Techniques for Diagnosing Medical Conditions"; or U.S. Patent Publication No. 20190026431, entitled "Discovering Genomes to Use in Machine Learning Techniques," each of which is hereby incorporated by reference herein in its entirety.

In the example of the LVEDP algorithm, thirteen (13) machine-learned classifier models are each calculated using the calculated feature outputs. The 13 classifier models include four ElasticNet machine-learned classifier models [9], four RandomForestClassifier machine-learned classifier models [10], and five extreme gradient boosting (XGB) classifier models [11]. In some embodiments, the patient's metadata information, such as age, gender, and BMI value, may be used. The output of the ensemble estimation may be a continuous score. The score may be shifted to a threshold value of zero by subtracting the threshold value for presentation within the web portal. The threshold value may be selected as a trade-off between sensitivity and specificity. The threshold may be defined within the algorithm and used as the determination point for test positive (e.g., "Likely Elevated LVEDP") and test negative (e.g., "Not Likely Elevated LVEDP") conditions.

In some embodiments, the analytical engine or analyzer can fuse the set of model scores with a body mass index-based adjustment or an adjustment based on age or gender. For example, the analytical engine or analyzer can average the model estimation with a sigmoid function of the patient BMI having the form $$\text{sigmoid}(x) = \frac{1}{1 + e^{-x}}.$$

Physician Portal Visualization (1236). The patient's report may include a visualization 1236 of the acquired patient data and signals and the results of the disease analyses. The analyses are presented, in some embodiments, in multiple views in the report. In the example shown in FIG. 12B, the visualization 1236 includes a score summary section 1240 (shown as "Patient LVEDP Score Summary" section 1240), a threshold section 1242 (shown as "LVEDP Threshold Statistics" section 1242), and a frequency distribution section 1244 (shown as "Frequency Distribution" section 1208). A healthcare provider, e.g., a physician, can review the report and interpret it to provide a diagnosis of the disease or to generate a treatment plan.

The healthcare portal may list a report for a patient if a given patient's acquired signal data set meets the signal quality standard. The report may indicate a disease-specific result (e.g., elevated LVEDP) being available if the signal analysis could be performed. The patient's estimated score (shown via visual elements 118*a*, 118*b*, 118*c*) for the disease-specific analysis may be interpreted relative to an established threshold.

In the score summary section 1240 shown in the example of FIG. 12B, the patient's score 118*a* and associated threshold are superimposed on a two-tone color bar (e.g., shown in section 1240) with the threshold located at the center of the bar with a defined value of "0" representing the delineation between test positive and test negative. The left of the threshold may be lightly shaded light and indicates a negative test result (e.g., "Not Likely Elevated LVEDP"), while to the right of the threshold may be darkly shaded to indicate a positive test result (e.g., "Likely Elevated LVEDP").

The threshold section 1242 shows reported statistics of the threshold as provided to a validation population that defines the sensitivity and specificity for the estimation of the patient score (e.g., 118). The threshold is the same for every test regardless of the individual patient's score (e.g., 118), meaning that every score, positive or negative, may be interpreted for accuracy in view of the provided sensitivity and specificity information. The score may change for a given disease-specific analysis as well with the updating of the clinical evaluation.

The frequency distribution section 1244 illustrates the distribution of all patients in two validation populations (e.g., (i) a non-elevated population to indicate the likelihood of a false positive estimation and (ii) an elevated population to indicate a likelihood of a false negative estimation). The graphs (1246, 1248) are presented as smooth histograms to provide context for interpreting the patient's score 118 (e.g., 118b, 118c) relative to the test performance validation population patients.

The frequency distribution section 1240 includes a first graph 1246 (shown as "Non-Elevated LVEDP Population" 1246) that shows the score (118b), indicating the likelihood of the non-presence of the disease, condition, or indication, within a distribution of a validation population having non-presence of that disease, condition, or indication and a second graph 1248 (shown as "Elevated LVEDP Population" 1248) that shows the score (118c), indicates the likelihood of the presence of the disease, condition, or indication, within a distribution of validation population having the presence of that disease, condition, or indication. In the example of the assessment of elevated LVDEP, the first graph 1246 shows a non-elevated LVEDP distribution of the validation population that identifies the true negative (TN) and false positive (FP) areas. The second graph 1248 shows an elevated LVEDP distribution of the validation population that identifies the false negative (TN) and true positive (FP) areas.

The frequency distribution section 1240 also includes interpretative text of the patient's score relative to other patients in a validation population group (as a percentage). In this example, the patient has an LVEDP score of −0.08, which is located to the left side of the LVEDP threshold, indicating that the patient has "Not Likely Elevated LVEDP."

The report may be presented in the healthcare portal, e.g., to be used by a physician or healthcare provider in their diagnosis for indications of left-heart failure. The indications include, in some embodiments, a probability or a severity score for the presence of a disease, medical condition, or an indication of either.

Outlier Assessment and Rejection Detection (1238). Following the AE add-on module 1214 computing the feature value outputs (in process 1232) and prior to their application to the classifier models (in process 1234), the AE add-on module 1214 is configured in some embodiments to perform outlier analysis (shown in process 1238) of the feature value outputs. Outlier analysis evaluation process 1238 executes a machine-learned outlier detection module (ODM), in some embodiments, to identify and exclude anomalous acquired biophysical signals by identifying and excluding anomalous feature output values in reference to the feature values generated from the validation and training data. The outlier detection module assesses for outliers that present themselves within sparse clusters at isolated regions that are out of distribution from the rest of the observations. Process 1238 can reduce the risk that outlier signals are inappropriately applied to the classifier models and produce inaccurate evaluations to be viewed by the patient or healthcare provider. The accuracy of the outlier module has been verified using hold-out validation sets in which the ODM is able to identify all the labeled outliers in a test set with the acceptable outlier detection rate (ODR) generalization.

While the methods and systems have been described in connection with certain embodiments and specific examples, it is not intended that the scope be limited to the particular embodiments set forth, as the embodiments herein are intended in all respects to be illustrative rather than restrictive. The conduction deviation features discussed herein may ultimately be employed to make, or to assist a physician or other healthcare provider in making, noninvasive diagnoses or determinations of the presence or non-presence and/or severity of other diseases, medical conditions, or indication of either, such as, e.g., coronary artery disease, pulmonary hypertension and other pathologies as described herein using similar or other development approaches. In addition, the example analysis, including the conduction deviation features, can be used in the diagnosis and treatment of other cardiac-related pathologies and indicating conditions as well as neurological-related pathologies and indicating conditions, such assessment can be applied to the diagnosis and treatment (including, surgical, minimally invasive, and/or pharmacologic treatment) of any pathologies or indicating conditions in which a biophysical signal is involved in any relevant system of a living body. One example in the cardiac context is the diagnosis of CAD, and other diseases, medical condition, or indicating conditions disclosed herein and its treatment by any number of therapies, alone or in combination, such as the placement of a stent in a coronary artery, the performance of an atherectomy, angioplasty, prescription of drug therapy, and/or the prescription of exercise, nutritional and other lifestyle changes, etc. Other cardiac-related pathologies or indicating conditions that may be diagnosed include, e.g., arrhythmia, congestive heart failure, valve failure, pulmonary hypertension (e.g., pulmonary arterial hypertension, pulmonary hypertension due to left heart disease, pulmonary hypertension due to lung disease, pulmonary hypertension due to chronic blood clots, and pulmonary hypertension due to other diseases such as blood or other disorders), as well as other cardiac-related pathologies, indicating conditions and/or diseases. Non-limiting examples of neurological-related diseases, pathologies or indicating conditions that may be diagnosed include, e.g., epilepsy, schizophrenia, Parkinson's Disease, Alzheimer's Disease (and all other forms of dementia), autism spectrum (including Asperger syndrome), attention deficit hyperactivity disorder, Huntington's Disease, muscular dystrophy, depression, bipolar disorder, brain/spinal cord tumors (malignant and benign), movement disorders, cognitive impairment, speech impairment, various psychoses, brain/spinal cord/nerve injury, chronic traumatic encephalopathy, cluster headaches, migraine headaches, neuropathy (in its various forms, including peripheral neuropathy), phantom limb/pain, chronic fatigue syndrome, acute and/or chronic pain (including back pain, failed back surgery syndrome, etc.), dyskinesia, anxiety disorders, indicating conditions caused by infections or foreign agents (e.g., Lyme disease, encephalitis, rabies), narcolepsy and other sleep disorders, post-traumatic stress disorder, neurological conditions/effects related to stroke, aneurysms, hemorrhagic injury, etc., tinnitus and other hearing-related diseases/indicating conditions and vision-related diseases/indicating conditions.

Further examples of processing that may be used with the exemplified method and system disclosed herein are described in: U.S. Pat. Nos. 9,289,150; 9,655,536; 9,968,275; 8,923,958; 9,408,543; 9,955,883; 9,737,229; 10,039,468; 9,597,021; 9,968,265; 9,910,964; 10,672,518; 10,566,091; 10,566,092; 10,542,897; 10,362,950; 10,292,596; 10,806,349; U.S. Patent Publication nos. 2020/0335217; 2020/0229724; 2019/0214137; 2018/0249960; 2019/0200893; 2019/0384757; 2020/0211713; 2019/0365265; 2020/0205739; 2020/0205745; 2019/0026430; 2019/0026431; PCT Publication nos. WO2017/033164; WO2017/221221; WO2019/130272; WO2018/158749; WO2019/077414; WO2019/130273; WO2019/244043; WO2020/136569; WO2019/234587; WO2020/136570; WO2020/136571; U.S. patent application Ser. Nos. 16/831,264; 16/831,380; 17/132,869; PCT Application nos. PCT/IB2020/052889; PCT/IB2020/052890, each of which is hereby incorporated by reference herein in its entirety.

In addition, the clinical evaluation system described herein may be configured to analyze biophysical signals such as an electrocardiogram (ECG), electroencephalogram (EEG), gamma synchrony, respiratory function signals, pulse oximetry signals, perfusion data signals; quasi-periodic biological signals, fetal ECG signals, blood pressure signals; cardiac magnetic field signals, heart rate signals, among others.

What is claimed is:

1. A method for non-invasively assessing a cardiac disease state or abnormal condition of a subject, the method comprising:
    obtaining, by one or more processors, a biophysical signal data set of the subject comprising a plurality of cardiac signals;
    generating, by the one or more processors, a high-energy subspace model of the plurality of cardiac signals, wherein the high-energy subspace model is generated from a signal-modeling algorithm that generates an energy subspace that includes only a top percentile of energy of each signal through a selection of one or more candidate signals;
    determining, by the one or more processors, a residue model from the high-energy subspace model;
    determining, by the one or more processors and based, at least in part, on the residue model, values of one or more conduction deviation properties associated with ventricular depolarization within the plurality of cardiac signals; and
    determining, by the one or more processors, an estimated value for a presence of a metric associated with the cardiac disease state or abnormal condition based, in part, on an application of the determined values of the one or more conduction deviation properties to an estimation model for the metric,
    wherein the estimated value for of the presence of the metric is used in the estimation model to non-invasively estimate the presence or non-presence of the cardiac disease state or condition for use in a diagnosis of the cardiac disease state or condition or to direct treatment of the cardiac disease state or condition.

2. The method of claim 1, wherein the steps of determining the values of one or more conduction deviation properties associated with ventricular depolarization comprises:
    determining, by the one or more processors, one or more values of one or more features extracted from the residue model associated with conduction skipping.

3. The method of claim 2, wherein the one or more features are selected from the group consisting of:
    a feature associated with an assessed number of conduction skipping identified within a depolarization associated portion of the residue model;
    a feature associated an assessed conduction distance identified with the depolarization associated portion of the residue model;
    a feature associated with a time index of a maximum conduction skipping event in the depolarization associated portion of the residue model;
    a feature associated with a tonicity of skipping peaks identified within the depolarization associated portion of the residue model; and
    a feature associated with a statistical assessment of an assessed accumulative conduction distance determined within the depolarization associated portion of the residue model.

4. The method of claim 1, wherein the steps of determining the values of one or more conduction deviation properties associated with ventricular depolarization comprises:
    determining, by the one or more processors, a three-dimensional residue model from the high-energy subspace model and the plurality of cardiac signals; and
    determining, by the one or more processors, one or more values of features extracted from the three-dimensional residue model associated with conduction skipping.

5. The method of claim 4, wherein the one or more features are selected from the group consisting of:
    a feature associated with a geometric parameter generated from a Poincaré model derived from the three-dimensional residue model; and
    a feature associated with an alpha radius of an alpha shape generated from the three-dimensional residue model.

6. The method of claim 5, wherein the geometric parameter is selected from the group consisting of an alpha radius parameter, a perimeter parameter, a surface area parameter, a parameter associated with a ratio of the perimeter over a surface area, a density parameter, a void parameter, and a porosity parameter.

7. The method of claim 5, wherein the geometric parameter has an associated geometric shape comprising an Alpha Hull shape or a Convex Hull shape.

8. The method of claim 1, wherein the signal-modeling algorithm is based on a Fourier analysis.

9. The method of claim 1, wherein the signal-modeling algorithm is based on a Fourier analysis or on a sparse decomposition algorithm.

10. The method of claim 1 further comprising:
    causing, by the one or more processors, generation of a visualization of the estimated value for the presence of the cardiac disease state or abnormal condition, wherein the generated visualization is rendered and displayed at a display of a computing device and/or presented in a report.

11. The method of claim 1, wherein the values of the one or more conduction deviation properties associated with ventricular depolarization are used in the estimation model selected from the group consisting of a linear model, a decision tree model, a random forest model, a support vector machine model, and a neural network model.

12. The method of claim 1, wherein the estimation model further includes features selected from the group consisting of:

one or more depolarization or repolarization wave propagation associated features;
one or more depolarization wave propagation deviation associated features;
one or more cycle variability associated features;
one or more dynamical system associated features;
one or more cardiac waveform topologic and variations associated features;
one or more PPG waveform topologic and variations associated features;
one or more cardiac or PPG signal power spectral density associated features;
one or more cardiac or PPG signal visual associated features; and
one or more predictability features.

13. The method of claim 1, wherein the cardiac disease state or abnormal condition is selected from the group consisting of coronary artery disease, pulmonary hypertension, pulmonary arterial hypertension, pulmonary hypertension due to left heart disease, rare disorders that lead to pulmonary hypertension, left ventricular heart failure or left-sided heart failure, right ventricular heart failure or right-sided heart failure, systolic heart failure, diastolic heart failure, ischemic heart disease, and arrhythmia.

14. The method of claim 1, further comprising:
acquiring, by one or more acquisition circuits of a measurement system, voltage gradient signals over one or more channels, wherein the voltage gradient signals are acquired at a frequency greater than about 1 kHz; and
generating, by the one or more acquisition circuits, the obtained biophysical signal data set from the acquired voltage gradient signals.

15. The method of claim 1, further comprising:
acquiring, by one or more acquisition circuits of a measurement system, one or more photoplethysmographic signals; and
generating, by the one or more acquisition circuits, the obtained biophysical signal data set from the acquired photoplethysmographic signals.

16. The method of claim 1, wherein the one or more processors are located in a cloud platform.

17. The method of claim 1, wherein the one or more processors are located in a local computing device.

18. A system comprising:
a processor; and
a memory having instructions stored thereon, wherein execution of the instructions by the processor causes the processor to:
obtain a biophysical signal data set of a subject comprising a plurality of cardiac signals;
generate a high-energy subspace model of the plurality of cardiac signals, wherein the high-energy subspace model is generated from a signal-modeling algorithm that generates an energy subspace that includes only a top percentile of energy of each signal through a selection of one or more candidate signals;
determine a residue model from the high-energy subspace model;
determine, and based, at least in part, on the residue model, values of one or more conduction deviation properties associated with ventricular depolarization within the plurality of cardiac signals; and
determine an estimated value for a presence of a metric associated with a cardiac disease state or abnormal condition based, in part, on an application of the determined values of the one or more conduction deviation properties to an estimation model for the metric,
wherein the estimated value for of the presence of the metric is used in the estimation model to non-invasively estimate the presence or non-presence of the cardiac disease state or condition for use in a diagnosis of the cardiac disease state or condition or to direct treatment of the cardiac disease state or condition.

19. A non-transitory computer readable medium having instructions stored thereon, wherein execution of the instructions by a processor causes the processor to:
obtain a biophysical signal data set of a subject comprising a plurality of cardiac signals;
generate a high-energy subspace model of the plurality of cardiac signals, wherein the high-energy subspace model is generated from a signal-modeling algorithm that generates an energy subspace that includes only a top percentile of energy of each signal through a selection of one or more candidate signals;
determine a residue model from the high-energy subspace model;
determine, and based, at least in part, on the residue model, values of one or more conduction deviation properties associated with ventricular depolarization within the plurality of cardiac signals; and
determine an estimated value for a presence of a metric associated with a cardiac disease state or abnormal condition based, in part, on an application of the determined values of the one or more conduction deviation properties to an estimation model for the metric,
wherein the estimated value for of the presence of the metric is used in the estimation model to non-invasively estimate the presence or non-presence of the cardiac disease state or condition for use in a diagnosis of the cardiac disease state or condition or to direct treatment of the cardiac disease state or condition.

* * * * *